(12) United States Patent
Tosa et al.

(10) Patent No.: US 12,333,818 B2
(45) Date of Patent: Jun. 17, 2025

(54) ROAD TYPE DETERMINATION APPARATUS AND DRIVING ASSISTANCE APPARATUS

(71) Applicants: DENSO CORPORATION, Aichi-pref. (JP); TOYOTA JIDOSHA KABUSHIKI KAISHA, Toyota (JP)

(72) Inventors: Takatoshi Tosa, Kariya (JP); Takayuki Kondoh, Kariya (JP); Shin Tanaka, Numazu (JP); Yuta Ikezawa, Susono (JP); Kazuhiro Morimoto, Toyota (JP)

(73) Assignees: DENSO CORPORATION, Aichi-pref. (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 558 days.

(21) Appl. No.: 17/496,842

(22) Filed: Oct. 8, 2021

(65) Prior Publication Data
US 2022/0027640 A1      Jan. 27, 2022

Related U.S. Application Data

(63) Continuation of application No. PCT/JP2020/016135, filed on Apr. 10, 2020.

(30) Foreign Application Priority Data

Apr. 12, 2019   (JP) .................................. 2019-076643

(51) Int. Cl.
*G06V 20/56*   (2022.01)
*B60W 40/06*   (2012.01)
*G01C 21/34*   (2006.01)

(52) U.S. Cl.
CPC ............. *G06V 20/56* (2022.01); *B60W 40/06* (2013.01); *G01C 21/3476* (2013.01);
(Continued)

(58) Field of Classification Search
CPC .......... B60W 40/06; B60W 2420/403; B60W 2552/20; B60W 2552/53; G01C 21/3476; G06V 20/588; G06T 7/00
See application file for complete search history.

(56) References Cited

U.S. PATENT DOCUMENTS

| 2010/0088024 A1* | 4/2010 | Takahara | G08G 1/09623 701/532 |
| 2015/0161455 A1* | 6/2015 | Osanai | G06V 20/582 382/104 |

(Continued)

FOREIGN PATENT DOCUMENTS

| JP | 2001-124570 A | 5/2001 |
| JP | 2009074986 A * | 4/2009 |

(Continued)

*Primary Examiner* — Bobbak Safaipour
*Assistant Examiner* — Ashley L. Hytrek
(74) *Attorney, Agent, or Firm* — Maschoff Brennan

(57) ABSTRACT

In a road type determination apparatus, an image information acquiring unit acquires image information in which an image of a travel road on which a vehicle is traveling is captured. A scene determining unit determines a traveling scene of the travel road based on the image information. An ordinary road likelihood calculating unit calculates an ordinary road likelihood that indicates that a type of the travel road of the vehicle is an ordinary road based on the traveling scene. A limited-access road likelihood calculating unit calculates a limited-access road likelihood that indicates that the type of the travel road of the vehicle is a limited-access road based on the traveling scene. A type determining unit determines the type of the travel road of the vehicle based on the ordinary road likelihood and the limited-access road likelihood.

13 Claims, 10 Drawing Sheets

(52) U.S. Cl.
CPC ... *B60W 2420/403* (2013.01); *B60W 2552/20* (2020.02); *B60W 2552/53* (2020.02); *B60W 2554/4045* (2020.02)

(56) References Cited

U.S. PATENT DOCUMENTS

| | | | | |
|---|---|---|---|---|
| 2016/0082978 A1* | 3/2016 | Ozaki | ............... | G01C 21/34 701/58 |
| 2018/0342155 A1* | 11/2018 | Lindholm | ............ | B60W 40/06 |
| 2019/0315363 A1* | 10/2019 | Kim | ............... | B60W 50/08 |

FOREIGN PATENT DOCUMENTS

| | | |
|---|---|---|
| JP | 2011-033494 A | 2/2011 |
| JP | 2014-130010 A | 7/2014 |
| JP | 2014-215698 A | 11/2014 |

* cited by examiner

FIG.3
```
         START
           ↓
    ┌──────────────┐  S201
    │ ACQUIRE ROAD │
    │     TYPE     │
    └──────────────┘
           ↓        S202
      ╱IS ROAD TYPE╲  NO
     ╱ LIMITED-ACCESS╲──────────┐
     ╲    ROAD ?    ╱           │
      ╲            ╱            │
           ↓YES                 ↓
    ┌─────────┐ S203    ┌──────────────┐ S204
    │PERMIT LCS│        │ PROHIBIT LCS │
    └─────────┘         └──────────────┘
           ↓◀───────────────────┘
          END
```
FIG.4
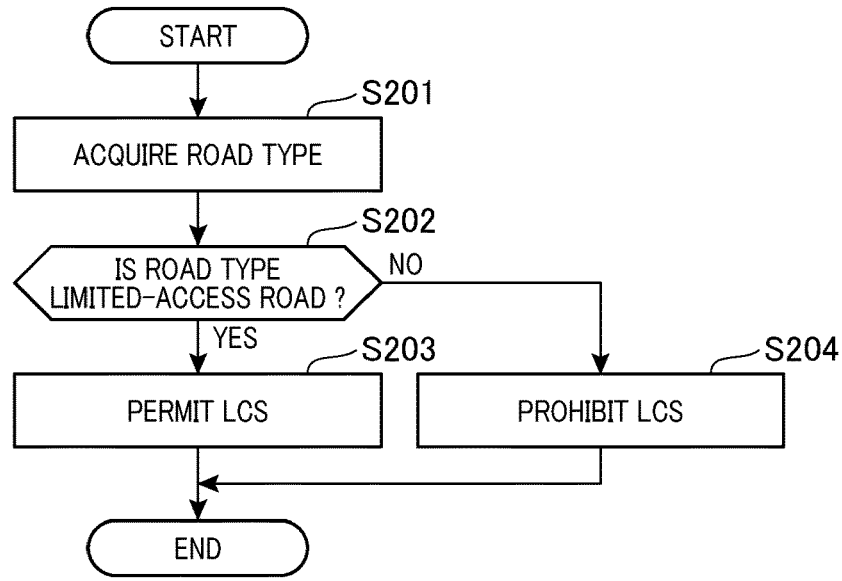
FIG.5
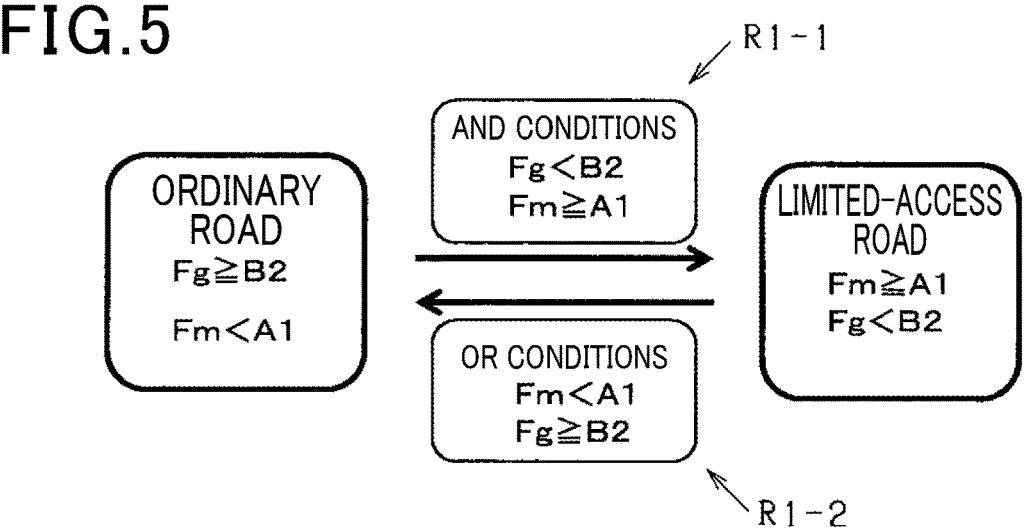

ROAD TYPE DETERMINATION APPARATUS AND DRIVING ASSISTANCE APPARATUS

CROSS-REFERENCE TO RELATED APPLICATIONS

The present application is a continuation application of International Application No. PCT/JP2020/016135, filed on Apr. 10, 2020, which claims priority to Japanese Patent Application No. 2019-076643, filed on Apr. 12, 2019. The contents of these applications are incorporated herein by reference in their entirety.

BACKGROUND

Technical Field

The present disclosure relates to a road type determination apparatus and a driving assistance apparatus.

Related Art

A road type determination apparatus and a driving assistance apparatus are known. The road type determination apparatus determines a type of a road on which a vehicle is traveling. The driving assistance apparatus performs driving assistance of the vehicle based on the type of road determined by the road type determination apparatus.

SUMMARY

One aspect of the present disclosure provides a road type determination apparatus that: acquires image information in which an image of a travel road on which a vehicle is traveling is captured; determines a traveling scene of the travel road based on the image information; calculates an ordinary road likelihood that indicates that a type of the travel road of the vehicle is an ordinary road based on the traveling scene; calculates a limited-access road likelihood that indicates that the type of the travel road of the vehicle is a limited-access road based on the traveling scene; and determines the type of the travel road of the vehicle based on the ordinary road likelihood and the limited-access road likelihood.

BRIEF DESCRIPTION OF THE DRAWINGS

In the accompanying drawings:

FIG. 3 is a flowchart of a driving assistance process according to the first embodiment;

FIG. 4 is a diagram of a scene determination example regarding a limited-access road and an ordinary road;

FIG. 5 is a conceptual diagram of the road type determination process according to the first embodiment;

DESCRIPTION OF THE EMBODIMENTS

Figure 1:
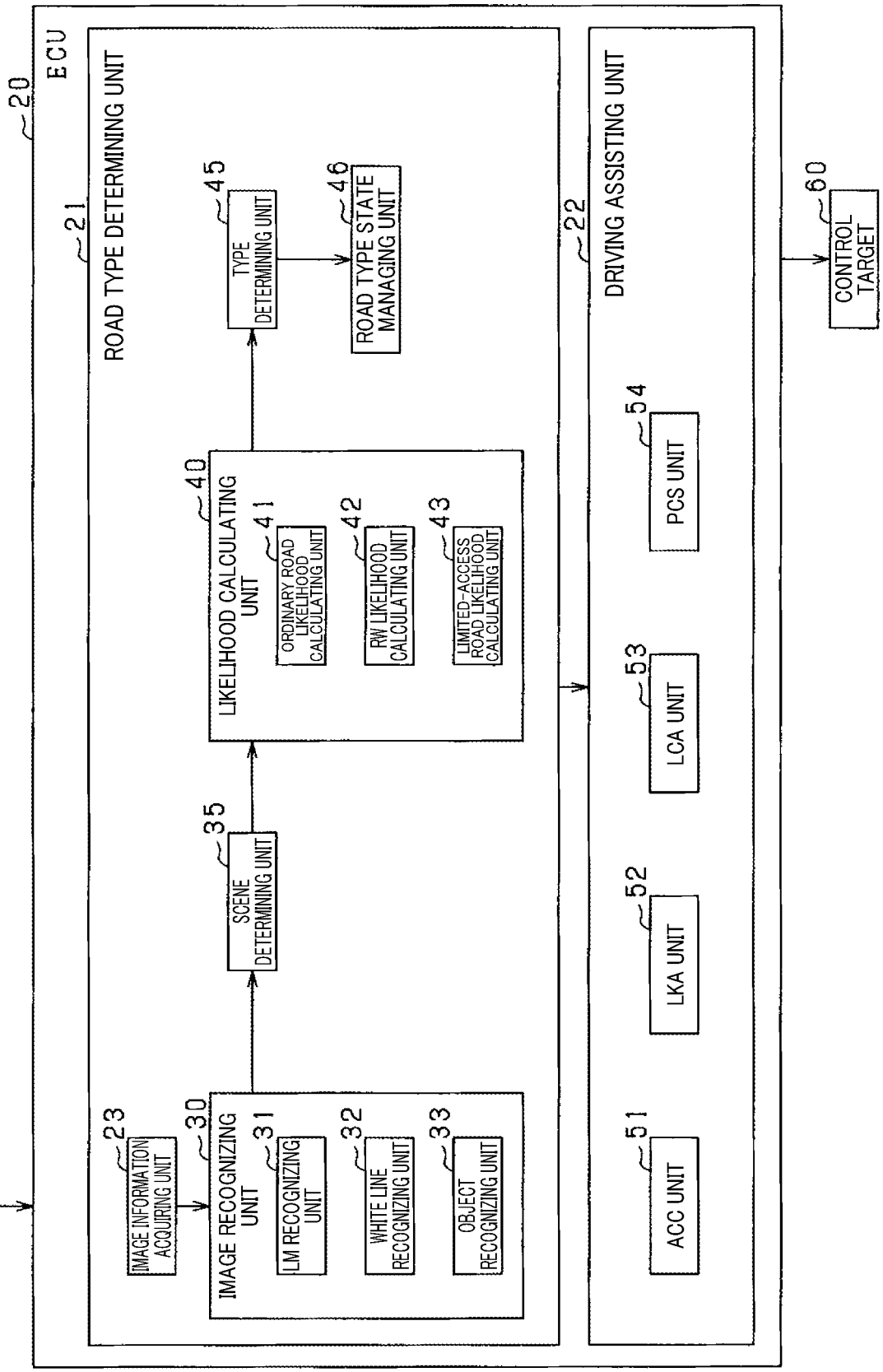
FIG. 1 is a schematic diagram of a vehicle in which an ECU that functions as a road type determination apparatus and a driving assistance apparatus according to an embodiment is mounted.

The present disclosure relates to a road type determination apparatus that determines a type of a road on which a vehicle is traveling and a driving assistance apparatus that performs driving assistance of the vehicle based on the type of road determined by the road type determination apparatus.

A technology for determining whether a road on which a vehicle is traveling is an expressway or an ordinary road is known. JP-A-2014-215698 describes that road determination regarding whether a road that is being traveled is an ordinary road or an expressway is performed based on a size of a traffic light that is recognized from two pieces of image data acquired from two cameras.

A driving assistance apparatus that is capable of performing a lane change system (LCS) that makes a vehicle automatically change traffic lanes is known. On an ordinary road on which pedestrians, bicycles, and the like are present, during lane change, there is danger of a collision with a pedestrian, a bicycle, or the like that is present in a blind spot of the vehicle. Therefore, a technology that prohibits assistance by LCS on ordinary roads and permits assistance by LCS only on limited-access roads is desired.

In JP-A-2014-215698, differentiation between an ordinary road and an expressway is described. However, differentiation between an ordinary road and a limited-access road is not described. In addition, in the technology in JP-A-2014-215698, the type of road cannot be determined when a traffic light is not detected.

It is thus desired to provide a technology that is related to a road type determination apparatus that is capable of more reliably determining a type of a road on which a vehicle is traveling.

A first exemplary embodiment of the present disclosure provides a road type determination apparatus that is provided includes: an image information acquiring unit that acquires image information in which an image of a travel road on which a vehicle is traveling is captured; a scene determining unit that determines a traveling scene of the travel road based on the image information; an ordinary road likelihood calculating unit that calculates an ordinary road likelihood that indicates that a type of the travel road of the vehicle is an ordinary road based on the traveling scene; a limited-access road likelihood calculating unit that calculates a limited-access road likelihood that indicates that the type of the travel road of the vehicle is a limited-access road based on the traveling scene; and a type determining unit that determines the type of the travel road of the vehicle based on the ordinary road likelihood and the limited-access road likelihood.

As a result of the road type determination apparatus of the present exemplary embodiment, the scene determining unit determines the traveling scene of the travel road of the vehicle based on the image information that is acquired by the image information acquiring unit. In addition, the ordinary road likelihood calculating unit and the limited-access road likelihood calculating unit respectively calculate the ordinary road likelihood and the limited-access road likelihood based on the determined traveling scene. Furthermore, the type determining unit determines the type of the road based on the ordinary road likelihood and the limited-access road likelihood. Because the road type can be determined based on the ordinary road likelihood and the limited-access road likelihood that are calculated based on the traveling scene, the type of the road on which the vehicle is traveling can be more reliably determined.

A second exemplary embodiment of the present disclosure provides a driving assistance apparatus that performs driving assistance of the vehicle based on the type of the travel road of the vehicle determined by the above-described road type determination apparatus. When the travel road of the vehicle is determined to be the limited-access road, the driving assistance apparatus permits performance of driving assistance in which the vehicle is made to automatically change traffic lanes. When the travel road of the vehicle is not determined to be the limited-access road, the driving assistance apparatus prohibits the performance of driving assistance in which the vehicle is made to automatically change traffic lanes.

As a result of the driving assistance apparatus of the present exemplary embodiment, when the road type determination apparatus determines that the travel road of the vehicle is a limited-access road, performance of LCS in which lane change is automatically performed is permitted. When the travel road of the vehicle is not determined to be the limited-access road, the performance of LCS is prohibited. As a result of the road type determination apparatus of the present disclosure, whether the performance of LCS is permitted or prohibited can be determined based on the road type that is more reliably determined. Consequently, for example, LCS can be more reliably prevented from being erroneously performed in a vehicle that is traveling on an ordinary road.

First Embodiment

FIG. 1 shows a vehicle control system 10 that is mounted in a vehicle. The vehicle control system 10 includes an imaging apparatus 12, an electronic control unit (ECU) 20, and a control target 60. The ECU 20 functions as a road type determination apparatus that determines a type of a road on which the vehicle is traveling, that is, a travel road. In addition, the ECU 20 also functions as a driving assistance apparatus that performs driving assistance of the vehicle based on the type of travel road of the vehicle that is determined by the road type determination apparatus.

For example, the imaging apparatus 12 may be a monocular camera, such as a charge-coupled device (CCD) camera, a complementary metal-oxide semiconductor (CMOS) image sensor, or a near-infrared camera. The imaging apparatus 12 may also be a stereo camera. Only a single imaging apparatus 12 may be set in the vehicle. Alternatively, a plurality of imaging apparatuses 12 may be set. For example, the imaging apparatus 12 is attached at a predetermined height in a center of the vehicle in a vehicle-width direction, and captures an image of an area that spreads over a predetermined angular range ahead of the vehicle from a bird's eye view. The imaging apparatus 12 extracts feature points that indicate the presence of an object in the captured image.

As an example, edge points are extracted based on luminance information of the captured image and Hough transform is performed on the extracted edge points. In the Hough transform, points on a straight line on which a plurality of edge points are consecutively arrayed and points at which straight lines intersect are extracted as feature points. The imaging apparatus 12 successively outputs, to the ECU 20, the captured images that are successively captured as sensing information.

The ECU 20 is mainly configured by a microcomputer that is composed of a central processing unit (CPU), a read-only memory (ROM), a random access memory (RAM), a backup RAM, an input/output (I/O), and the like (all not shown). The functions described in the present specification can be actualized by the ECU 20 running various control programs that are stored in the ROM.

The ECU 20 includes a road type determining unit 21 and a driving assisting unit 22. The road type determining unit 21 determines the type of travel road of the vehicle. The road type determining unit 21 includes an image information acquiring unit 23, an image recognizing unit 30, a scene determining unit 35, a likelihood calculating unit 40, a type determining unit 45, and a road type state managing unit 46.

The image information acquiring unit 23 acquires image information that is acquired from the imaging apparatus 12 by an image of a periphery of the vehicle being captured. The image recognizing unit 20 performs image recognition on the image information acquired by the image information acquiring unit 23. The image recognizing unit 30 includes a landmark (LM) recognizing unit 31, a white line recognizing unit 32, and an object recognizing unit 33.

For example, the image recognizing unit 30 acquires the image information that is acquired by the image information acquiring unit 23, identifies a target that is present in the periphery of the vehicle based on the image information and dictionary information for identification of a target that is prepared in advance, and determines a type thereof. The image recognizing unit 30 determines the type of the object by collating the image information and the dictionary information by pattern matching.

In addition, the image recognizing unit 30 acquires positional information (including a lateral width and the like of the target) of the target in an advancing direction of the vehicle and a lateral direction that is substantially perpendicular thereto, based on the image information and the dictionary information. The dictionary information for identification is individually prepared based on the type of target such as a landmark, a white line, and other objects, and is stored in advance in the ECU 20.

The LM recognizing unit 31 recognizes landmark information that is related to a landmark by referencing an identification dictionary for landmarks (LM identification dictionary). Specifically, as the landmark information, a presence/absence of a landmark in the image information is recognized. In addition, a type, position, size, and the like of the landmark are also recognized. A landmark refers to differing types of boundary markers of a road or geographical features that serve as markers. Specifically, a road sign that indicates an entrance onto a limited-access road, a traffic light, an intersection, and the like can be given as examples.

The white line recognizing unit 32 extracts and connects edge points of a lane marker paint, and recognizes white line information that is related to a white line on the travel road of the vehicle. Specifically, as the white line information, a presence/absence of a white line in the image information is recognized. In addition, an aspect (specifically, a type, position, width, length, curvature, color, and the like of the white line) of the white line is recognized.

Furthermore, an identification dictionary (road marking identification dictionary) for road markings such as regulatory markings and indication markings may be stored in the ECU 20. The white line recognizing unit 32 may be configured to be capable of recognizing information related to the road markings. The road marking identification dictionary includes information that is related to aspects of road markings and installation methods that are prescribed based on orders related to road signs, boundary lines, and road markings.

The object recognizing unit 33 recognizes object information that is related to an object in the periphery of the vehicle by referencing an identification dictionary for objects that are not applicable as landmarks, among the objects in the periphery of the vehicle (object identification dictionary). Specifically, as the object information, a type, position, size, movement speed, movement direction, and the like of the object in the image information are recognized. Specifically, the object recognizing unit 33 recognizes a road structure such as a median strip, a soundproofing wall, a guardrail, a signboard, a tree, or a building, a moving body such as an automobile, a motorcycle, a bicycle, or a pedestrian, and the like as an object that is not applicable as a landmark.

The scene determining unit 35 determines a traveling scene of the vehicle based on a predetermined algorithm from the results of image recognition by the image recognizing unit 30. As an example, when the object recognizing unit 33 recognizes a traffic light, a pedestrian, and a parked vehicle while the vehicle is traveling in a vehicle speed range that is equal to or less than 60 km/h, the traveling scene is determined to be an intersection scene. In addition, when the object recognizing unit 33 continuously detects rubber poles (lane separators) after passing a limited-access road start sign that is recognized by the LM recognizing unit 31, the traveling scene is determined to be a provisional service scene. As examples of other scene determinations, lane increase/decrease, merging/branching, tollgate/service area (SA), provisional service, and the like can be considered.

The likelihood calculating unit 40 calculates a likelihood that is related to the road type of the travel road of the vehicle based on the traveling scene of the vehicle determined by the scene determining unit 35. The likelihood calculating unit 40 includes an ordinary road likelihood calculating unit 41, a ramp way (RW) likelihood calculating unit 42, and a limited-access road likelihood calculating unit 43. The likelihood is a plausibility. The likelihoods of the road types can each be calculated as a probability of the scene determined by the scene determining unit 35 being obtained under a condition that the travel road of the vehicle is the road type.

The ordinary road likelihood calculating unit 41 calculates an ordinary road likelihood Fg that indicates that the type of travel road of the vehicle is an ordinary road, based on the traveling scene. For example, when a scene determination result such as an intersection that has a traffic light, an annular intersection (roundabout), connection to a no-entry road, a no-passing zone, a road with a narrow lane width, a two-way road, or a presence of a parked vehicle on the road is obtained, a calculation value of the ordinary road likelihood Fg increases.

The RW likelihood 42 calculates an RW likelihood Fr that indicates that the travel road of the vehicle is a ramp way, based on the traveling scene. The ramp way generally refers to a sloped road. However, in the present specification, the ramp way refers to a ramp way that is provided between an ordinary road and a limited-access road, and connects the ordinary road and the limited-access road. For example, when a scene determination result such as white lines on both sides of the vehicle are solid lines or a travel road of the vehicle has a sharp curve (such as a curve that is about less than R100) is obtained, a calculation value of the RW likelihood Fr increases.

The limited-access road likelihood calculating unit 43 calculates a limited-access road likelihood Fm that indicates that the type of travel road of the vehicle is a limited-access road, based on the traveling scene. For example, when a scene determination result such as a road sign for a limited-access road is passed, a service area is present, a white line for merging with a limited-access road is crossed, or a road surface is marked with a white line for a limited-access road is obtained, a calculation value of the limited-access road likelihood Fm increases.

The type determining unit 45 determines the road type of the travel road of the vehicle based on the likelihoods Fg, Fr, and Fm calculated by the likelihood calculating unit 40. In the determination of the road type, the type determining unit 45 is preferably configured to determine the road type based on the ordinary road likelihood Fg and the limited-access road likelihood Fm. The type determining unit 45 may also be configured to determine the road type based on the RW likelihood Fr as well.

For use in a driving assistance process described hereafter, the type determining unit 45 is merely required to be configured to be capable of determining at least whether the type of the road is the limited-access road. In cases in which the type of the road is not the limited-access road, the type determining unit 45 may be configured to be capable of further determining whether the type of the road corresponds to any of the ordinary road, the ramp way, and unknown.

The type determining unit 45 may be configured to determine the road type based on comparisons to predetermined first threshold A1 and second threshold A2 that are set for the limited-access road likelihood Fm, predetermined third threshold B1 and fourth threshold B2 that are set for the ordinary road likelihood Fg, and predetermined fifth threshold C1 and sixth threshold C2 that are set for the ramp way likelihood Fr.

The first threshold A1 is set as a lower limit value to be met by the limited-access road likelihood Fm to determine that the road type is the limited-access road. The second threshold A2 is set as an upper limit value to be met by the limited-access road likelihood Fm to determine that the road type is not the limited-access road. The third threshold B1 is set as a lower limit value to be met by the ordinary road likelihood Fg to determine that the road type is the ordinary road. The fourth threshold B2 is set as an upper limit value to be met by the ordinary road likelihood Fm to determine that the road type is not the ordinary road. The fifth threshold C1 is set as a lower limit value to be met by the RW likelihood Fr to determine that the road type is the ramp way. The sixth threshold C2 is set as an upper limit value to be met by the RW likelihood Fr to determine that the road type is not the ramp way.

For example, the type determining unit 45 may determine that the road type is the limited-access road when $Fm \geq A1$ and is not the limited-access road when $Fm \leq A2$. In addition, the type determining unit 45 may determine that the road type is the ordinary road when $Fg \geq B1$ and is not the ordinary road when $Fg \leq B2$. Furthermore, the type determining unit

45 may determine that the road type is the ramp way when $Fr \geq C1$ and is not the ramp way when $Fr \leq C2$.

Moreover, for example, in cases in which the likelihood of a certain road type is large and the likelihoods of the other road types are small, the type determining unit 45 may determine that the road type that has the large likelihood is the road type of the travel road of the vehicle. Specifically, the travel road of the vehicle may be determined to be the limited-access road when $Fm \geq A1$, $Fg < B2$, and $Fr < C2$. Here, the thresholds are set such that $A1 \geq A2$, $B1 \geq B2$, and $C1 \geq C2$. A1 and A2, B1 and B2, and C1 and C2 may respectively be unified as a same value.

The type determining unit 45 may further determine the road type under a condition that a state in which magnitudes of the likelihoods Fm, Fg, and Fr meet a predetermined condition is equal to or greater than a predetermined time. For example, when time Tm during which $Fm \geq A1$ is equal to or greater than a predetermined time Tth, the travel road of the vehicle may be determined to be a limited-access road. Time-based conditions similar to $Tm \geq Tth$ may be set for the likelihoods Fg and Fr as well. As a result of the time-based conditions being set, determination accuracy regarding road type can be further improved.

The type determining unit 45 may assign an order of priority when using image recognition results from each of the LM recognizing unit 31, the white line recognizing unit 32, and the object recognizing unit 33, or use the image recognition results in a complementary manner. The condition for determining the road type is preferably changed as appropriate based on which of the landmark information, the white line information, and the object information the scene determination that is performed is based.

When the road type is determined using the landmark information, a correlation in which the calculation value of the limited-access road likelihood Fm decreases when the calculation value of the ordinary road likelihood Fg increases, and the calculation value of the limited-access road likelihood Fm increases when the calculation value of the ordinary road likelihood Fg decreases may be established. In this case, when either of the likelihoods Fg and Fm increases, the type determining unit 45 can assume that the other has decreased and determine the road type.

In contrast, when the road type is determined using the white line information or the object information, the correlation between the magnitudes of the likelihoods Fg and Fm such as that described above is not necessarily established. Therefore, the type determining unit 45 is preferably configured to preferentially use the landmark information when differentiating between the ordinary road and the limited-access road. In addition, when the landmark information cannot be used, and the white line information or the object information is used to differentiate between the ordinary road and the limited-access road, the type determining unit 45 is preferably configured to differentiate among the ordinary road, the limited-access road, and unknown. As a result of the type unknown being added, erroneous determination when the road type is determined to be the ordinary road or the limited-access road can be suppressed.

Regarding differentiation of the ramp way, the ramp way can be determined with relatively good accuracy based on the white line information, due to structural features thereof. Scenes such as white lines on both sides of the vehicle are solid lines and a travel road of the vehicle has a sharp curve (such as a curve that is about less than R100) can be determined based on the white line information. In such scenes, the calculation value of the ramp way likelihood Fr increases, and the calculation values of the limited-access road likelihood Fm and the ordinary road likelihood Fg decrease. Therefore, when differentiating among the ordinary road, the limited-access road, and the ramp way, the type determining unit 45 is preferably configured to preferentially use the landmark information and the white line information.

The road type state managing unit 46 acquires and manages the road type of the travel road of the vehicle determined by the type determining unit 45. The type determining unit 45 may be configured to be capable of reading the road type that is managed by the road type state managing unit 46 and using the road type in a determination process for the road type.

The driving assisting unit 22 performs driving assistance of the vehicle based on the type of travel road of the vehicle determined by the road type determining unit 21. For example, as the driving assistance, a control command signal for controlling the control target 60 is outputted.

The driving assisting unit 22 provides various driving assistance functions (at least the LCS function). As an example, the driving assisting unit 22 is configured to be capable of performing automatic driving and automatic parking of the vehicle based on a traveling plan or the like, by including an adaptive cruise control (ACC) unit 51, a lane keeping assist (LKA) unit 52, an LCS unit 53, and a pre-crash safety (PCS) unit 54.

The ACC unit 51 provides an ACC function, and automatically controls a traveling speed of the vehicle such as to maintain a target inter-vehicle distance to a leading vehicle by adjusting driving force and braking force. The LKA unit 52 provides an LKA function, and makes the vehicle travel such as to automatically keep a traffic lane in which the vehicle is traveling by generating steering force in a direction that inhibits approach towards a traveling boundary line. The LCS unit 53 provides an LCS function and automatically performs lane change in which the vehicle is moved to an adjacent traffic lane. The PCS unit 54 provides a PCS function, and determines whether a collision with the vehicle will occur regarding an object that is positioned in the periphery of the vehicle, and automatically performs control to prevent a collision with the object or reduce collision damage.

When the road type determining unit 21 determines that the travel road of the vehicle is a limited-access road, the driving assisting unit 22 permits performance of driving assistance in which the vehicle is made to automatically change traffic lanes by the LCS unit 53. In addition, when the road type determining unit 21 does not determine that the travel road of the vehicle is a limited-access road, the driving assisting unit 22 prohibits performance of driving assistance in which the vehicle is made to automatically change traffic lanes by the LCS unit 53. Specifically, the road type that is managed by the road type state managing unit 46 is read, and permission or prohibition of automatic lane change by the LCS unit 53 is determined.

The control target 60 includes a driving apparatus, a braking apparatus, a steering apparatus, a warning apparatus, and a display apparatus. The control target 60 is configured to operate based on a control command from the ECU 20 and operate as a result of an operation input by a driver. Here, the operation input by a driver may be inputted to the control target 60 as a control command signal to the ECU 20 after being appropriately processed by the ECU 20. For example, the ECU 20 provides a function for automatically controlling the driving apparatus, the braking apparatus, the steering apparatus, and the like based on the traveling plan or a vehicle state of the vehicle, or for collision avoidance and lane change.

Figure 2:
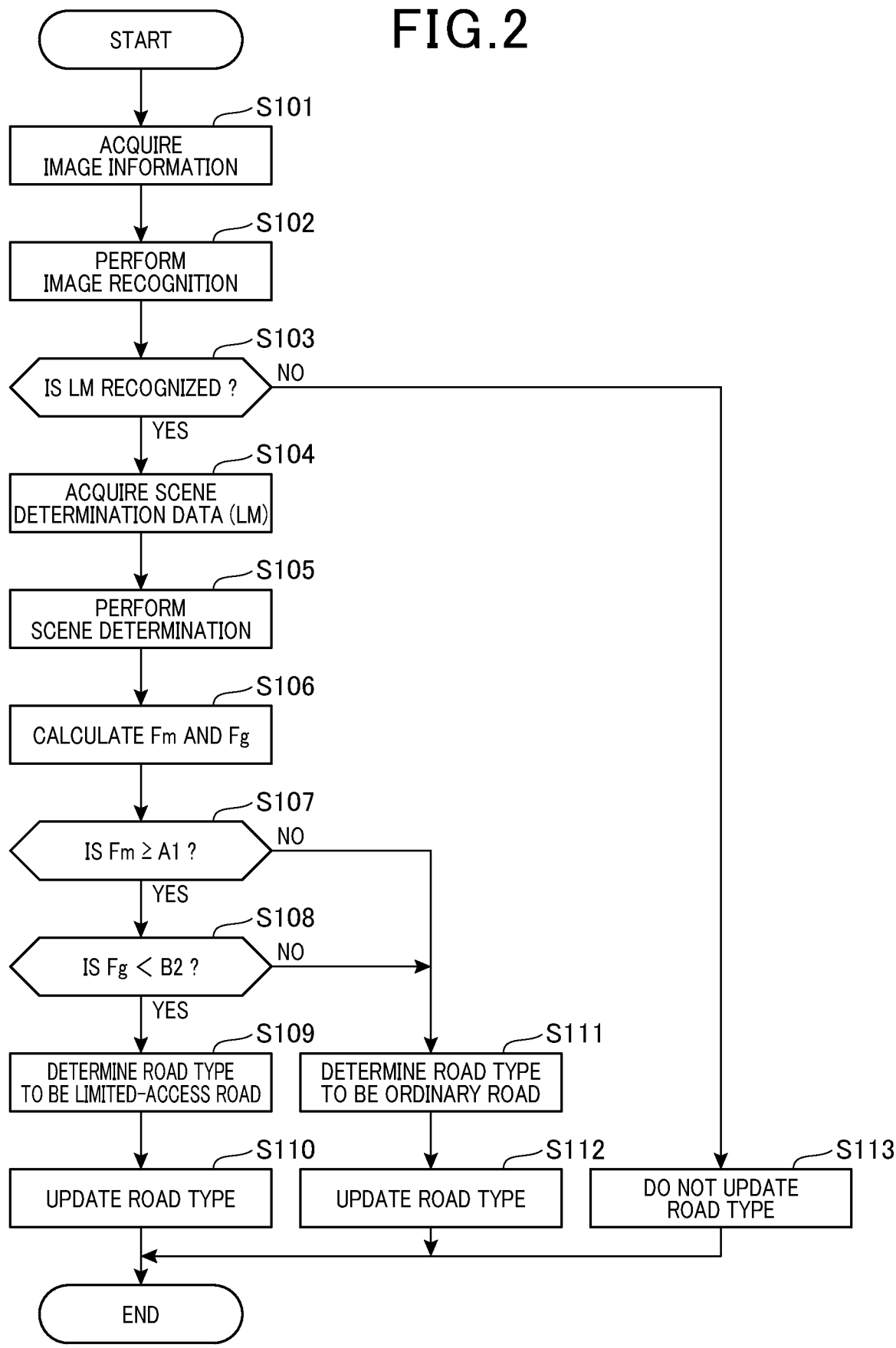
FIG. 2 is a flowchart of a road type determination process according to a first embodiment.

According to the first embodiment, the road type determination process and the driving assistance process performed by the ECU 20 will be described giving as an example a case in which the scene determination is performed based on the landmark information that is recognized by the LM recognizing unit 31, the limited-access road likelihood Fm and the ordinary road likelihood Fg are calculated, and the road type is determined to be either of the limited-access road and the ordinary road. FIG. 2 shows a flowchart of the road type determination process performed by the ECU 20. In addition, FIG. 3 shows a flowchart of the driving assistance process performed by the ECU 20. The processes shown in FIGS. 2 and 3 are repeatedly performed at a predetermined cycle during driving of the vehicle.

At step S101, the ECU 20 acquires, from the imaging apparatus 12, the image information that is acquired by an image of the periphery of the vehicle being captured. At subsequent step S102, the ECU 20 performs image recognition on the acquired image information, and recognizes the landmark information.

At step S103, the ECU 20 determines whether a landmark is recognized. When a landmark is recognized, the ECU 20 proceeds to step S104. When no landmark is recognized, the ECU 20 proceeds to step S113 and ends the process without updating the road type.

At step S104, the ECU 20 acquires scene determination data that corresponds to the landmark information. For example, as shown in FIG. 4, when a road sign that indicates a limited-access road is recognized as a landmark, the scene determination data that includes a road sign for a limited-access road is acquired. In addition, for example, when a traffic light and an intersection are recognized as landmarks, the scene determination data that includes traffic light and intersection are acquired.

At step S105, the ECU 20 performs the scene determination based on the scene determination data. For example, as shown in FIG. 4, the scene is determined to be a scene such as a road sign for a limited-access road (limited-access road start sign) is passed, an intersection that has a traffic light, connection to a no-entry road, a no-passing zone, or a sign that is characteristic of an ordinary road is recognized. As a sign that is characteristic of an ordinary road, a low-speed speed limit sign, a no-entry sign, a sign indicating a railway crossing, and the like can be given as examples.

At step S106, the ECU 20 calculates the limited-access road likelihood Fm and the ordinary road likelihood Fg based on the scene determination result. For example, when the likelihoods Fm and Fg are calculated based on a scene that is a road sign for a limited-access road is passed, shown in a left-hand column in FIG. 4, the calculation value of the limited-access road likelihood Fm increases and the calculation value of the ordinary road likelihood Fg decreases.

In addition, for example, when the likelihoods Fm and Fg are calculated based on a scene that is an intersection that has a traffic light, shown in a right-hand column in FIG. 4, the calculation value of the limited-access road likelihood Fm decreases and the calculation value of the ordinary road likelihood Fg increases. The landmarks that are given as examples are differing types of boundary markers of a road or geographical features that serve as markers. Therefore, when the likelihoods Fm and Fg are calculated based on the landmark information, when one likelihood increases, the other likelihood decreases.

At step S107, the ECU 20 determines whether the limited-access road likelihood Fm is equal to or greater than the predetermined first threshold A1. When Fm≥A1, the ECU 20 proceeds to step S108. When, Fm<A1, the ECU 20 proceeds to step S111.

At step S108, the ECU 20 determines whether the ordinary road likelihood Fg is less than the predetermined fourth threshold B2. When Fg<B2, the ECU 20 proceeds to step S109. When Fg≥B2, the ECU 20 proceeds to step S111.

When affirmative determinations are made at step S107 and step S108, and the ECU 20 proceeds to step S109, the road type is determined to be the limited-access road. Subsequently, the ECU 20 proceeds to step S110 and ends the process after updating the road type to limited-access road.

When a negative determination is made at step S107 or step S108 and the ECU 20 proceeds to step S111, the road type is determined to be the ordinary road. Subsequently, the ECU 20 proceeds to step S111, and ends the process after updating the road type to ordinary road.

Here, when the likelihoods Fm and Fg are calculated based on the landmark information, when one likelihood increases, the other likelihood decreases. Therefore, when a setting value of the first threshold A1 is sufficiently large, it is clear that Fg<B2 when Fm≥A1. Therefore, the process at step S108 is not necessarily a requisite process.

FIG. 3 shows a flowchart of the driving assistance process performed by the ECU 20. The process shown in FIG. 3 is repeatedly performed at a predetermined cycle during driving of the vehicle.

At step S201, the ECU 20 acquires the road type that is determined in the process shown in FIG. 2 and managed by the ECU 20.

At step S202, the ECU 20 determines whether the road type is the limited-access road. When the road type is the limited-access road, the ECU 20 proceeds to step S203 and permits performance of LCS. That is, the ECU 20 permits performance of driving assistance in which lane change to move the vehicle to an adjacent traffic lane is automatically performed. When the road type is not the limited-access road, the ECU 20 proceeds to step S204 and prohibits the performance of LCS. Subsequently, the process is ended.

As described above, in the road type determination process according to the first embodiment, when the landmark is recognized, the ECU 20 determines the road type by performing the scene determination based on the landmark information and updates the stored road type. The road type is determined using the limited-access road likelihood Fm and the ordinary road likelihood Fg.

Specifically, as shown in FIG. 5, when Fm≥A1 and Fg<B2 (condition R1-1) are met, the road type is determined to be the limited-access road. In addition, as a result of the condition R1-1 for determining that the road type is the limited-access road being set with Fm≥A1 and Fg<B2 as AND conditions, possibility of the road type being erroneously determined to be the limited-access road can be reduced. Therefore, permission/prohibition of LCS can be appropriately determined. LCS can be reliably prevented from being erroneously performed in a vehicle that is traveling on an ordinary road.

Furthermore, when the setting value of the first threshold A1 is set to be sufficiently large to calculate the likelihoods Fm and Fg based on the landmark information, Fg<B2 when Fm≥A1. In such cases, the condition R1-1 is essentially satisfied by Fm≥A1 being met, and the road type is determined to be the limited-access road. In addition, a condition R1-2 is satisfied by Fm<A2 being met, and the road type is determined to be the ordinary road. The road type can be appropriately determined even in a configuration in which the condition R1-1 is only Fm≥A1 being met and the condition R1-2 is only Fm<A2 being met.

Here, when the road type determination process shown in FIG. 2 is performed, the white line recognizing unit 32, the object recognizing unit 33, and the RW likelihood calculating unit 42 of the ECU 20 are not requisite configurations.

Second Embodiment

Figure 6:
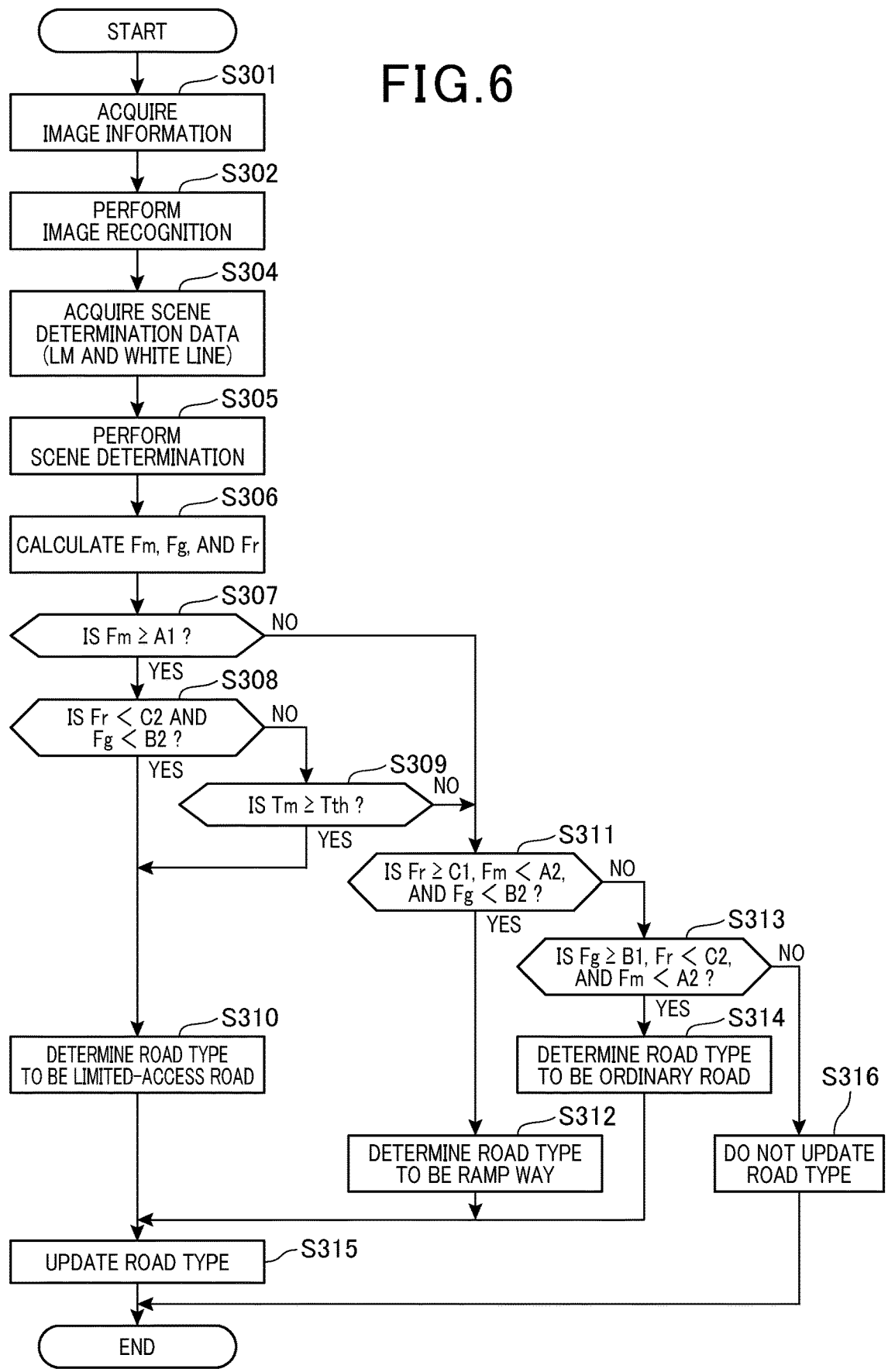
FIG. 6 is a flowchart of a road type determination process according to a second embodiment.

According to a second embodiment, a case in which the scene determination is performed based on the landmark information that is recognized by the LM recognizing unit 31 and the white line information that is recognized by the white line recognizing unit 32, the limited-access road likelihood Fm, the ordinary road likelihood Fg, and the RW likelihood Fr are calculated, and whether the road type is the limited-access road, the ramp way, or the ordinary road is determined will be described as an example. FIG. 6 shows a flowchart of a road type determination process performed by the ECU 20. The process shown in FIG. 6 is repeatedly performed at a predetermined cycle during driving of the vehicle.

At step S301, the ECU 20 acquires, from the imaging apparatus 12, the image information that is acquired by an image of the periphery of the vehicle being captured. The ECU 20 proceeds to step S302. At step S302, the ECU 20 performs image recognition on the acquired image information, and recognizes landmarks and white lines. When a landmark is recognized, the color, type, size, position, and the like are also recognized as the landmark information. When a white line is recognized, an aspect of the white line is also recognized as the white line information.

Figure 7:
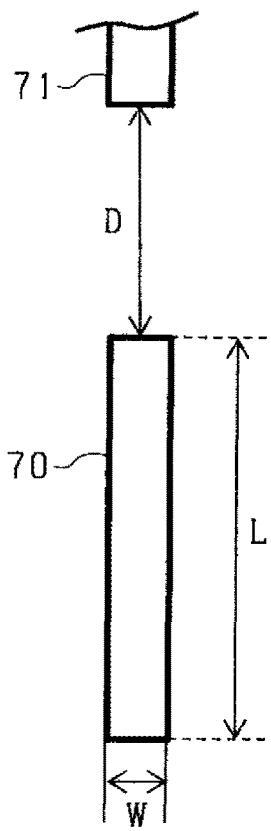
FIG. 7 is a diagram for explaining an aspect of a white line.

Specifically, a width, length, curvature, color, whether the white line is a solid line or a broken line, an interval of the broken line when the white line is the broken line, and the like are also recognized. Here, for example, the length, width, and interval of the white line can be defined by a length along a traveling direction of a white line 70 being a length L, a length in a direction perpendicular to the traveling direction being a width W, and an interval D between the white line 70 and a white line 71 that is adjacent to the white line 70 along the traveling direction, as shown in FIG. 7. Subsequently, the ECU 20 proceeds to step S304.

At step S304, the ECU 20 acquires the scene determination data that corresponds to the landmark information or the white line information. For example, as shown in FIG. 4, when the road sign that indicates a limited-access road is recognized as the landmark, the scene determination data that includes a road sign for a limited-access road is acquired. In addition, the aspect of the white line has characteristics at switching of the limited-access road, the ordinary road, and the ramp way. The scene determination data that corresponds to the aspect of the recognized white line is acquired.

At step S305, the ECU 20 performs the scene determination based on the scene determination data. For example, the scene is determined to be a scene such as a road sign for a limited-access road is passed and a white line for merging from a ramp way to a limited-access road is crossed, white lines on both sides of the vehicle are solid lines that have a large curvature, or an intersection that has a traffic light.

At step S306, the ECU 20 calculates the limited-access road likelihood Fm, the ordinary road likelihood Fg, and the RW likelihood Fr based on the scene determination result. For example, when the likelihoods Fm, Fg, and Fr are calculated based on a scene that is a road sign for a limited-access road is passed, the calculation values of the limited-access road likelihood Fm and the RW likelihood Fr increase, and the calculation value of the ordinary road likelihood Fg decreases. In addition, when the likelihoods Fm, Fg, and Fr are calculated based on a scene that is white lines on both sides of the vehicle are solid lines that have a large curvature after the road sign for a limited-access road is passed, the calculation value of the RW likelihood Fr increases even more and the calculation value of the limited-access road likelihood Fm decreases.

Furthermore, when the likelihoods Fm, Fg, and Fr are calculated based on a scene that is a white line for merging from a ramp way to a limited-access road is crossed after the road sign for a limited-access road is passed, the calculation value of the limited-access road likelihood Fm increases even more and the calculation value of the RW likelihood Fr decreases. The calculation value of the ordinary road likelihood Fg remains small.

In addition, for example, as shown in FIG. 4, when the likelihoods Fm, Fg, and Fr are calculated based on a scene such as an intersection that has a traffic light, junction with a no-entry road, a no-passing zone, a road sign or the like that is characteristic of an ordinary road is recognized, the calculation value of the ordinary road likelihood Fg increases.

At steps S307 and S308, the ECU 20 determines whether the limited-access road likelihood Fm, the ordinary road likelihood Fg, and the RW likelihood Fr respectively meet limited-access road determination conditions (according to the present embodiment, Fm≥A1, Fg<B2, and Fr<C2). First, at S307, the ECU 20 determine whether the condition Fm≥A1 is met. When the condition is met, the ECU 20 proceeds to S308. When the condition is not met, the ECU 20 proceeds to S311.

At S308, the ECU 20 determines whether the conditions Fg<B2 and Fr<C2 are met. When the conditions are met, the ECU 20 proceeds to step S310 and determines the road type to be the limited-access road. Subsequently, the ECU 20 proceeds to step S315. When the conditions at S308 are not met, the ECU 20 proceeds to step S309.

At step S309, the ECU 20 determines whether a duration time Tm over which a state in which the condition Fm≥A1 is met continues is equal to or greater than a predetermined threshold Tth. When Tm≥Tth, the ECU 20 proceeds to step S310 and determines the road type to be the limited-access road. When Tm<Tth, the ECU 20 proceeds to step S311.

At step S311, the ECU 20 determines whether the limited-access road likelihood Fm, the ordinary road likelihood Fg, and the RW likelihood Fr respectively meet ramp way determination conditions (according to the present embodiment, Fm<A2, Fg<B2, and Fr≥C1). When all three conditions Fm<A2, Fg<B2, and Fr≥C1 are met, the ECU 20 proceeds to step S312 and determines the road type to be the ramp way. Subsequently, the ECU 20 proceeds to step S315. When even a single condition that is not met is present among the three conditions Fm<A2, Fg<B2, and Fr≥C1, the ECU 20 proceeds to step S313.

At step S313, the ECU 20 determines whether the limited-access road likelihood Fm, the ordinary road likelihood Fg, and the RW likelihood Fr respectively meet ordinary road determination conditions (according to the present embodiment, Fm<A2, Fg≥B1, and Fr<C2). When all three conditions Fm<A2, Fg≥B1, and Fr<C2 are met, the ECU 20 proceeds to step S314 and determines the road type to be the ordinary road. Subsequently, the ECU 20 proceeds to step S315. When even a single condition that is not met is present among the three conditions Fm<A2, Fg≥B1, and Fr<C2, the ECU 20 proceeds to step S316.

At step S315, the ECU 20 updates the road type based on the road type determined at step S310, S312, or S314, and ends the process. At step S316, the ECU 20 ends the process without updating the road type.

As described above, in the road type determination process according to the second embodiment, the ECU 20 determines the road type by performing the scene determination when the landmark or the white line is recognized, and updates the stored road type.

Figure 8:
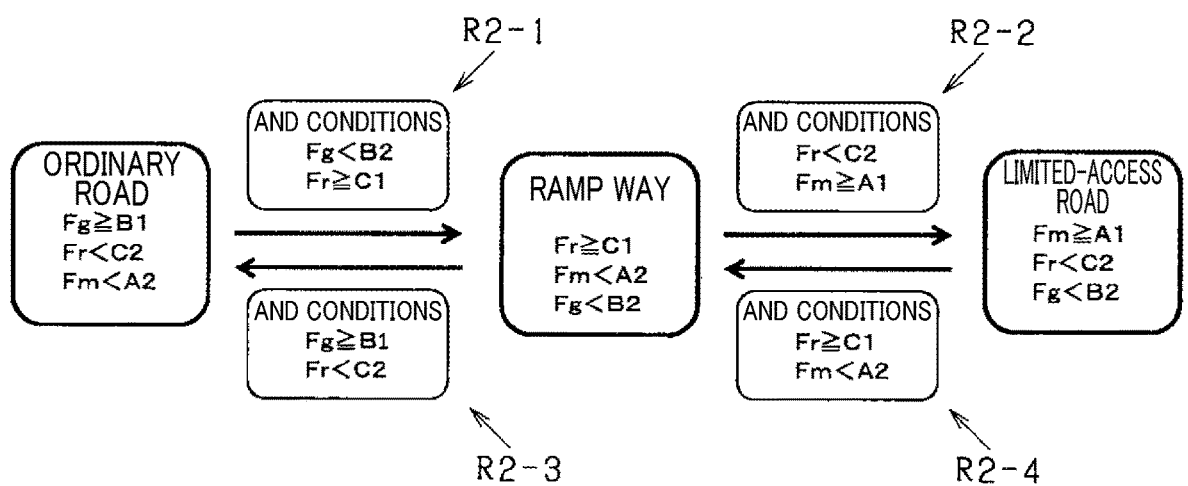
FIG. 8 is a conceptual diagram of the road type determination process according to the second embodiment.

The presence/absence of the road sign that indicates a limited-access road can be recognized as the landmark information. Therefore, the ordinary road and the ramp way or the limited-access road can be accurately differentiated. Furthermore, because the aspect of the white line can be recognized as the white line information, the ramp way and the limited-access road can be accurately differentiated. Therefore, for example, as shown in FIG. 8, in essence, an ordinary road state transitions to a ramp way state by a condition R2-1 (Fr≥C1 and Fg<B2) being met.

In addition, a limited-access road state transitions to the ramp way state by a condition R2-4 (Fr≥C1 and Fm<A2) being met. Furthermore, the ramp way state transitions to the limited-access road state by a condition R2-2 (Fm≥A1 and Fr<C2) being met and to the ordinary road state by a condition R2-3 (Fg≥B1 and Fr<C2) being met. As indicated by the conditions R2-1 to R2-4 shown in FIG. 8, the road type can be accurately determined even in a configuration in which the road type is determined by a portion of the conditions at steps S307, S308, S311, and S313 in FIG. 6.

In addition, the road type is determined to be any of the limited-access road, the ordinary road, and the ramp way using the limited-access road likelihood Fm, the ordinary road likelihood Fg, and the RW likelihood Fr. Therefore, driving assistance such as vehicle speed control that is required to enter a limited-access road from a ramp way can be performed based on the road type.

Furthermore, as indicated at step S309, even when the limited-access road determination conditions (Fm≥A1, Fg<B2, and Fr<C2) are not met, when the duration time Tm over which a state that is Fm≥A1 is continued is equal to or greater than the predetermined threshold Tth, the road type is determined to be the limited-access road. As a result, for example, even in cases in which a road shape or a white line shape is such that a boundary between the ordinary road and the ramp way or the limited-access road is unclear, the road type can be determined to be the limited-access road without the determination result of the road type being fixed such as to be held at a previous value.

Here, in the ramp way determination indicated at step S311 as well, determinations of a condition: Fr≥C1 and conditions: Fm<A2 and Fg<B2 may be successively performed in a manner similar to that at steps S307 and S308, and a determination in which a duration time during which a state in which a condition that is the condition: Fr≥C1 is met is continued is compared to a threshold may be performed in a manner similar to that at step S309.

In addition, in the ordinary road determination indicated at step S313 as well, determinations of a condition: Fg≥B1 and conditions: Fm<A2 and Fr<C2 may be successively performed in a manner similar to that at steps S307 and S308, and a determination in which a duration time during which a state in which a condition that is the condition: Fg≥B1 is met is continued is compared to a threshold may be performed in a manner similar to that at step S309.

Here, when the road type determination process shown in FIG. 6 is performed, the object recognizing unit 33 of the ECU 20 is not a requisite configuration. In addition, according to other embodiments as well, determination accuracy regarding road type can be improved using a time-based condition such as that indicated at step S309 as a condition for determining the road type.

Third Embodiment

Figure 9:
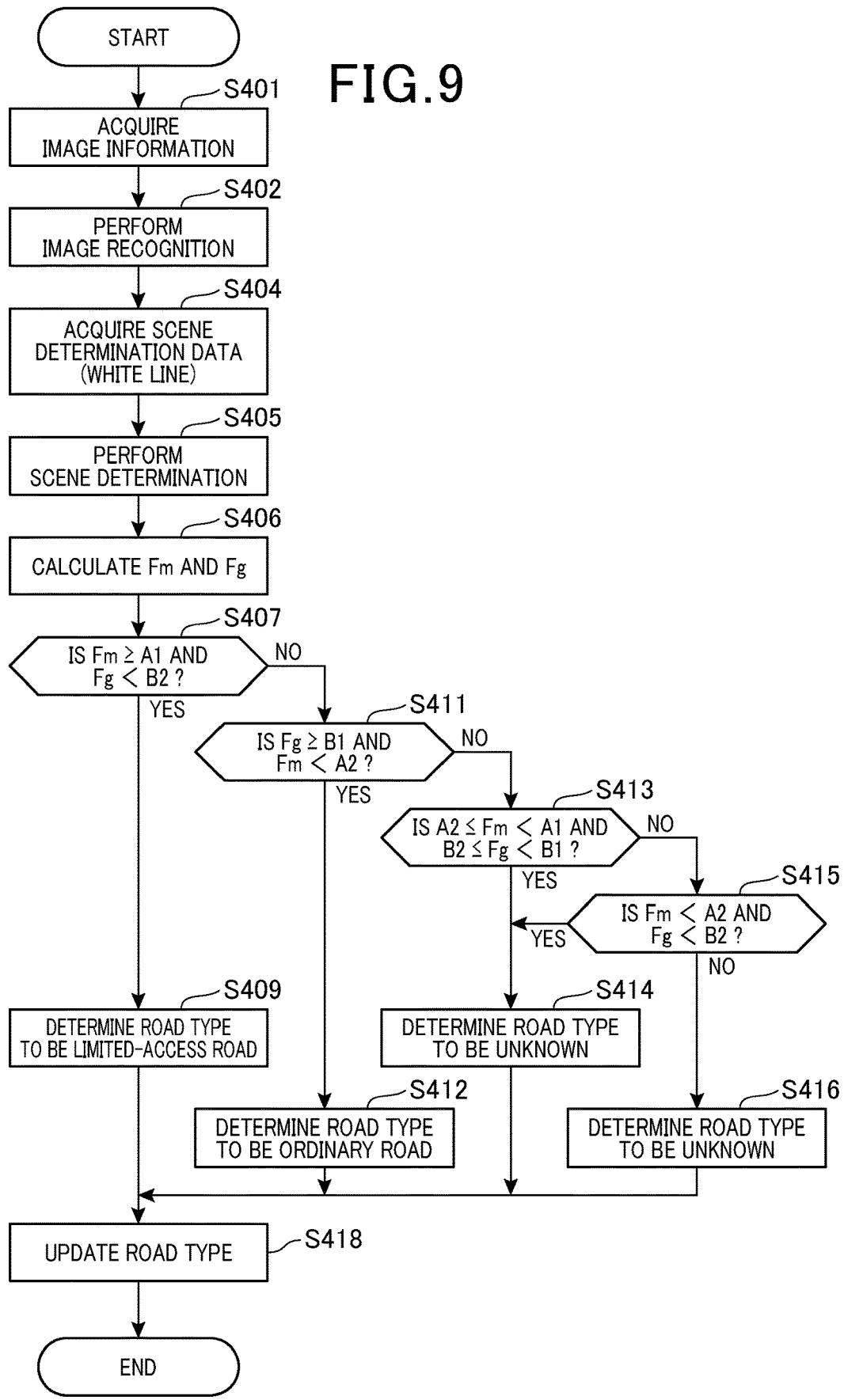
FIG. 9 is a flowchart of a road type determination process according to a third embodiment.

According to a third embodiment, a case in which the scene determination is performed based on the white line information that is recognized by the white line recognizing unit 32, the limited-access road likelihood Fm and the ordinary road likelihood Fg are calculated, and whether the road type is the limited-access road, the ordinary road, or unknown is determined will be described as an example. FIG. 9 shows a flowchart of a road type determination process performed by the ECU 20. The process shown in FIG. 9 is repeatedly performed at a predetermined cycle during driving of the vehicle.

At step S401, the ECU 20 acquires, from the imaging apparatus 12, the image information that is acquired by an image of the periphery of the vehicle being captured. At subsequent step S402, the ECU 20 performs image recognition on the acquired image information, and recognizes, as the white line information, a presence/absence of a white line and an aspect thereof.

At step S404, the ECU 20 acquires the scene determination data that corresponds to the white line information. At step S405, the ECU 20 performs the scene determination based on the scene determination data. For example, the scene is determined to be a scene such as a road with a narrow lane width is being traveled, a two-way road is being traveled, or a road that is marked by a white line for a limited-access road is being traveled. Whether the white line is that of a limited-access road or that of an ordinary road can be determined based on the length L, width W, and interval D of the white line included in the white line information.

At step S406, the ECU 20 calculates the limited-access road likelihood Fm and the ordinary road likelihood Fg based on the scene determination result. For example, when the likelihoods Fm and Fg are calculated based on a scene that is a road with a narrow lane width is being traveled, a two-way road is being traveled, or the like, the calculation value of the limited-access road likelihood Fm decreases and the calculation value of the ordinary road likelihood Fg increases.

In addition, for example, when the likelihoods Fm and Fg are calculated based on a scene that is a road that is marked by a white line for a limited-access road is being traveled, the calculation value of the limited-access road likelihood Fm increases and the calculation value of the ordinary road likelihood Fg decreases.

At step S407, the ECU 20 determines whether the limited-access road likelihood Fm and the ordinary road likelihood Fg respectively meet the limited-access road determination conditions (according to the present embodiment, Fm≥A1 and Fg<B2). When the two conditions Fm≥A1 and Fg<B2 are both met, the ECU 20 proceeds to step S409 and determines the road type to be the limited-access road. Subsequently, the ECU 20 proceeds to step S418. When at least either condition of the two conditions Fm≥A1 and Fg<B2 is not met, the ECU 20 proceeds to step S411.

At step S411, the ECU 20 determines whether the limited-access road likelihood Fm and the ordinary road likelihood Fg respectively meet the ordinary road determination conditions (according to the present embodiment, Fm<A2 and Fg≥B1). When the two conditions Fm<A2 and Fg≥B1 are both met, the ECU 20 proceeds to step S412 and determines the road type to be the ordinary road. Subsequently, the ECU 20 proceeds to step S418. When at least either condition of the two conditions Fm<A2 and Fg≥B1 is not met, the ECU 20 proceeds to step S413.

At step S413, the ECU 20 determines whether the limited-access road likelihood Fm and the ordinary road likelihood Fg respectively meet first unknown conditions (according to the present embodiment, A2≤Fm<A1 and B2≤Fg<B1). When the two conditions A2≤Fm<A1 and B2≤Fg<B1 are both met, the ECU 20 proceeds to step S414 and determines the road type to be unknown. Subsequently, the ECU 20 proceeds to step S418. When at least either condition of the two conditions A2≤Fm<A1 and B2≤Fg<B1 is not met, the ECU 20 proceeds to step S415.

At step S415, the ECU 20 determines whether the limited-access road likelihood Fm and the ordinary road likelihood Fg respectively meet second unknown conditions (according to the present embodiment, Fm<A2 and Fg<B2). When the two conditions Fm<A2 and Fg<B2 are both met, the ECU 20 proceeds to step S414 and determines the road type to be unknown. Subsequently, the ECU 20 proceeds to step S418. When at least either condition of the two conditions Fm<A2 and Fg<B2 is not met, the ECU 20 proceeds to step S416 and determines the road type to be unknown.

A case in which the road type is determined to be unknown at step S416 corresponds to a case in which the determination result is particularly more ambiguous than that when the road type is determined to be unknown at step S414. Therefore, when the road type is determined to be unknown at step S416, as shown in FIG. 9, the ECU 20 may subsequently proceed to step S418 or may not update the road type in a manner similar to that at step S113 in FIG. 2 according to the first embodiment.

At step S418, the ECU 20 updates the road type based on the road type determined at step S409, S412, S414, or S416, and ends the process.

As described above, in the road type determination process according to the third embodiment, the ECU 20 determines the road type by performing the scene determination based on the white line information, and updates the stored road type.

Figure 10:
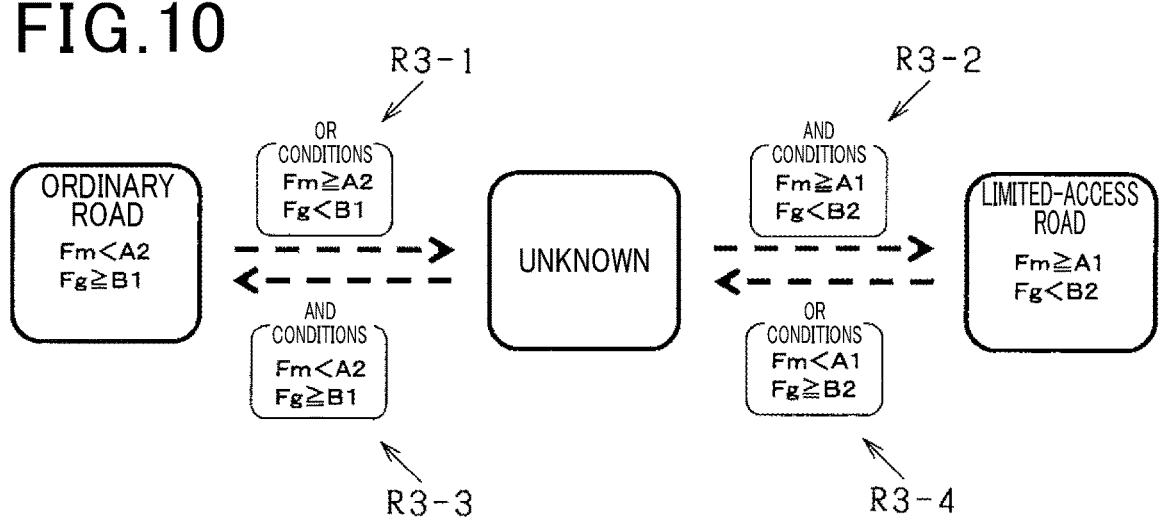
FIG. 10 is a conceptual diagram of the road type determination process according to the third embodiment.

The road type is determined using the limited-access road likelihood Fm and the ordinary road likelihood Fg. Specifically, as shown in FIG. 10, the road type is determined to be the limited-access road when a condition R3-2 (Fm≥A1 and Fg<B2) that is set as AND conditions is met. In addition, the road type is determined to be the ordinary road when a condition R3-3 (Fm<A2 and Fg≥B1) that is set as AND conditions is met. When the limited-access road likelihood Fm and the ordinary road likelihood Fg correspond to a condition R3-1 or a condition R3-4, that is, when neither condition R3-2 nor condition R3-3 is met, the road type is determined to be unknown.

When the white line information recognized by the white line recognizing unit 32 is used, when the conditions R3-2 and R3-3 that are set as AND conditions are met, the road types are respectively determined to be the limited-access road and the ordinary road. In addition, when neither of the conditions R3-2 and R3-3 is met, the road type is determined to be unknown. As a result, determination accuracy regarding road type can be ensured. Possibility of the road type being erroneously determined to be the limited-access road and possibility of the road type being erroneously determined to be the ordinary road can be reduced. Therefore, permission/prohibition of LCS can be appropriately determined. LCS can be reliably prevented from being erroneously performed in a vehicle that is traveling on an ordinary road.

Here, when the road type determination process shown in FIG. 9 is performed, the LM recognizing unit 31, the object recognizing unit 33, and the RW likelihood calculating unit 42 of the ECU 20 are not requisite configurations.

Fourth Embodiment

According to a fourth embodiment, a case in which the scene determination is performed based on the object information regarding the periphery of the vehicle that is recognized by the object recognizing unit 33, the limited-access road likelihood Fm and the ordinary road likelihood Fg are calculated, and whether the road type is the limited-access road, the ordinary road, or unknown is determined will be described as an example.

Regarding an object other than a target that is recognized as a landmark by the LM recognizing unit 31, the object recognizing unit 33 recognizes a type, size, position, movement direction, movement speed, and the like of the object as the object information.

Figure 11A:
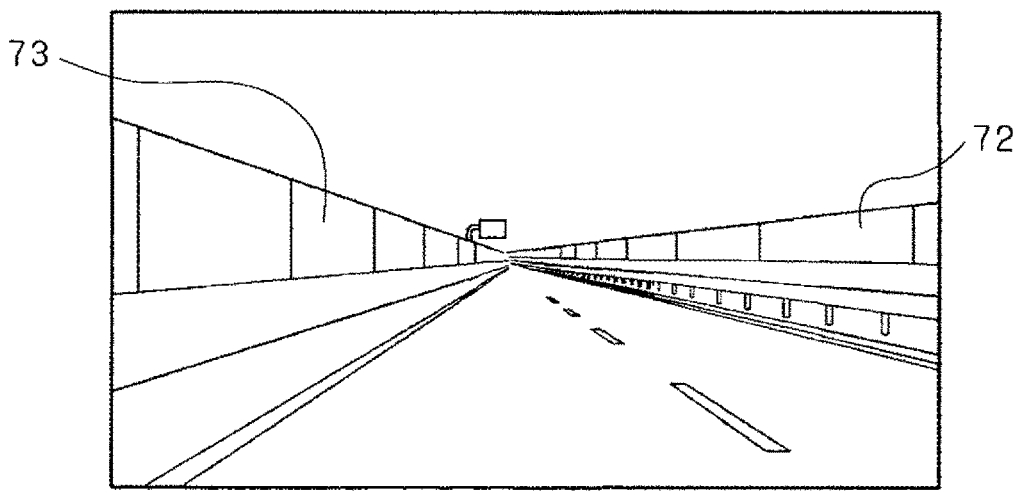
FIG. 11A is a diagram of an example of object recognition on a limited-access road.
Figure 11B:
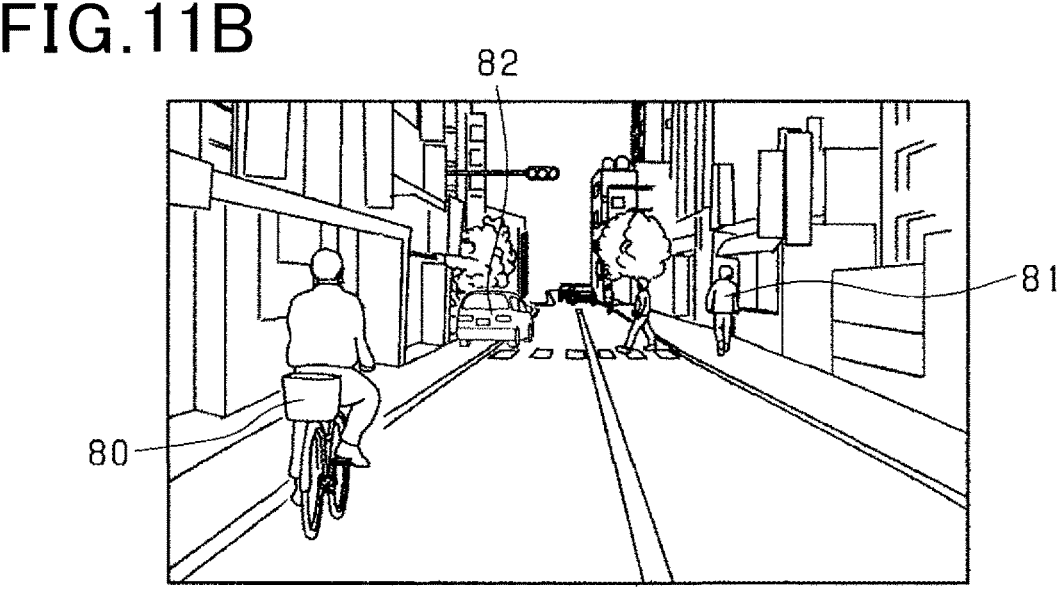
FIG. 11B is a diagram of an example of object recognition on an ordinary road.

For example, as shown in FIG. 11A, as when a median strip 72 or a sound-proofing wall 73 is recognized as the object, the scene can be determined to be a scene that is related to a limited-access road. In addition, as shown in FIG. 11B, when a bicycle 80, a pedestrian 81, a parked vehicle 82 on the road, or the like is recognized as the object, the scene can be determined to be a scene that is related to an ordinary road.

Figure 12:
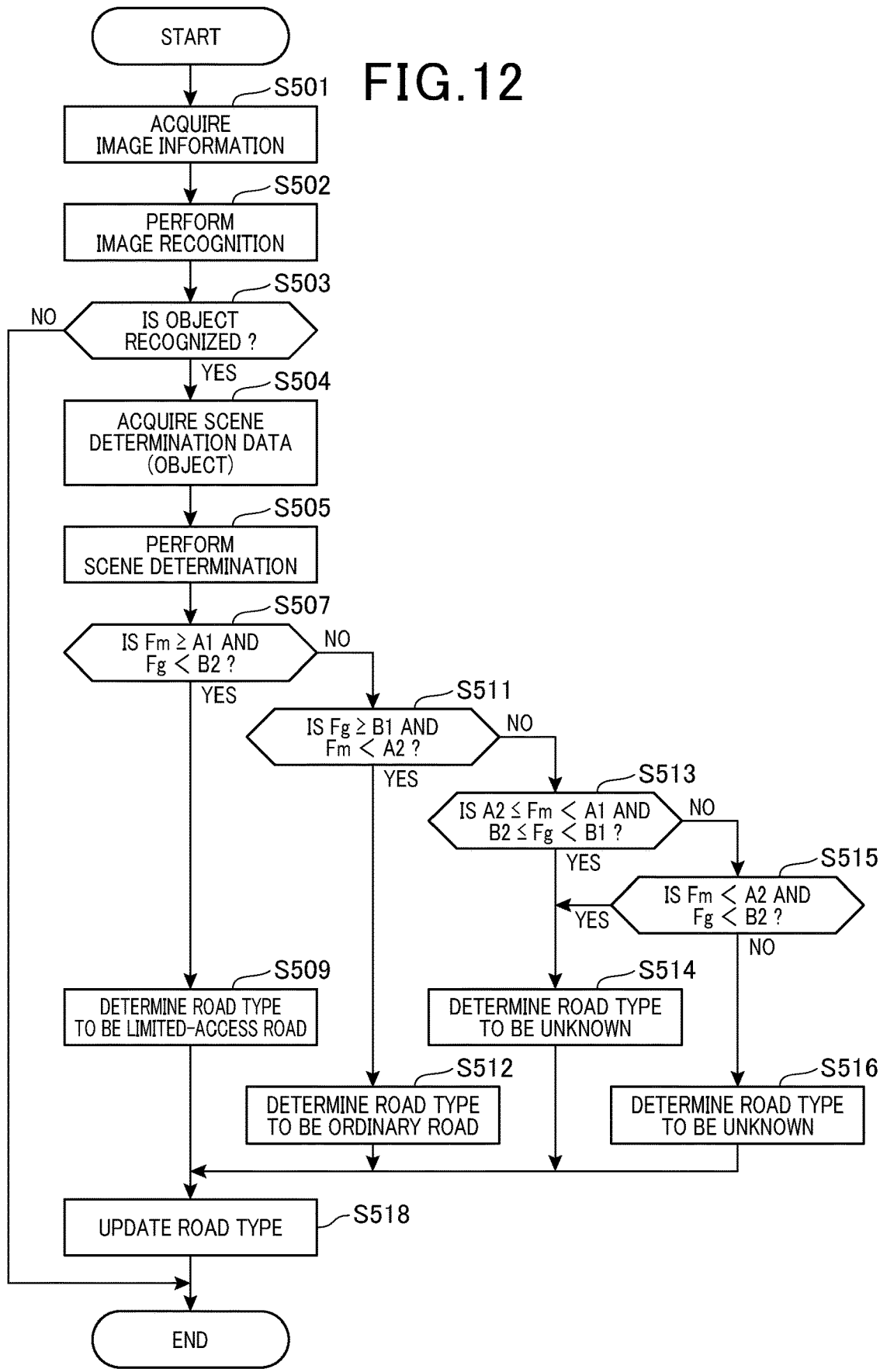
FIG. 12 is a flowchart of a road type determination process according to a fourth embodiment.

FIG. 12 shows a flowchart of a road type determination process performed by the ECU 20. The process shown in FIG. 12 is repeatedly performed at a predetermined cycle during driving of the vehicle.

At step S501, the ECU 20 acquires, from the imaging apparatus 12, the image information that is acquired by an image of the periphery of the vehicle being captured. At subsequent step S502, the ECU 20 performs image recognition on the acquired image information, and recognizes the object information.

At step S503, the ECU 20 determines whether an object (an object that is stored in the object identification dictionary) that is not applicable as a landmark is present in the periphery of the vehicle. When such an object is recognized, the ECU 20 proceeds to step S504. When such an object is not recognized, the process is ended.

At step S504, the ECU 20 acquires the scene determination data that corresponds to the object information. For example, as shown in FIG. 11A, the scene determination data that includes the median strip, the sound-proofing wall, the bicycle, the parked vehicle on a road, the pedestrian, or the like is acquired.

At step S505, the ECU 20 performs the scene determination based on the scene determination data. For example, the scene is determined to be a scene such as an area between a sound-proofing wall and a median strip is being traveled, a road on which a bicycle is traveling is being traveled, or a road on which an on-road parked vehicle is present is being traveled.

At step S506, the ECU 20 calculates the limited-access road likelihood Fm and the ordinary road likelihood Fg based on the scene determination result. For example, when the likelihoods Fm and Fg are calculated based on a scene that is a traffic lane between a sound-proofing wall and a median strip is being traveled in a high-speed range equal to or greater than 80 km/h, the calculation value of the limited-access road likelihood Fm increases and the calculation value of the ordinary road likelihood Fg decreases. The limited-access road likelihood Fm is calculated.

In addition, for example, when the likelihoods Fm and Fg are calculated based on a scene that is a road on which a bicycle is traveling is being traveled, the calculation value of the limited-access road likelihood Fm decreases and the calculation value of the ordinary road likelihood Fg increases.

At step S507, the ECU 20 determines whether the limited-access road likelihood Fm and the ordinary road likelihood Fg respectively meet the limited-access road determination conditions (according to the present embodiment, Fm≥A1 and Fg<B2). When the two conditions Fm≥A1 and Fg<B2 are both met, the ECU 20 proceeds to step S509 and determines the road type to be the limited-access road. Subsequently, the ECU 20 proceeds to step S518. When at least either condition of the two conditions Fm≥A1 and Fg<B2 is not met, the ECU 20 proceeds to step S511.

At step S511, the ECU 20 determines whether the limited-access road likelihood Fm and the ordinary road likelihood Fg respectively meet the ordinary road determination conditions (according to the present embodiment, Fm<A2 and Fg≥B1). When the two conditions Fm<A2 and Fg≥B1 are both met, the ECU 20 proceeds to step S512 and determines the road type to be the ordinary road. Subsequently, the ECU 20 proceeds to step S518. When at least either condition of the two conditions Fm<A2 and Fg≥B1 is not met, the ECU 20 proceeds to step S513.

At step S513, the ECU 20 determines whether the limited-access road likelihood Fm and the ordinary road likelihood Fg respectively meet the first unknown conditions (according to the present embodiment, A2≤Fm<A1 and B2≤Fg<B1). When the two conditions A2≤Fm<A1 and B2≤Fg<B1 are both met, the ECU 20 proceeds to step S514 and determines the road type to be unknown. Subsequently, the ECU 20 proceeds to step S518. When at least either condition of the two conditions A2≤Fm<A1 and B2≤Fg<B1 is not met, the ECU 20 proceeds to step S515.

At step S515, the ECU 20 determines whether the limited-access road likelihood Fm and the ordinary road likelihood Fg respectively meet the second unknown conditions (according to the present embodiment, Fm<A2 and Fg<B2). When the two conditions Fm<A2 and Fg<B2 are both met, the ECU 20 proceeds to step S514 and determines the road type to be unknown. Subsequently, the ECU 20 proceeds to step S518. When at least either condition of the two conditions Fm<A2 and Fg<B2 is not met, the ECU 20 proceeds to step S516 and determines the road type to be unknown.

A case in which the road type is determined to be unknown at step S516 corresponds to a case in which the determination result is particularly more ambiguous than that when the road type is determined to be unknown at step S514. Therefore, when the road type is determined to be unknown at step S516, as shown in FIG. 12, the ECU 20 may subsequently proceed to step S518 or may not update the road type in a manner similar to that at step S113 in FIG. 2 according to the first embodiment.

At step S518, the ECU 20 updates the road type based on the road type determined at step S509, S512, S514, or S516, and ends the process.

As described above, in the road type determination process according to the fourth embodiment, the ECU 20 determines the road type by performing the scene determination based on the object information, and updates the stored road type.

In a manner similar to that according to the third embodiment, as shown in FIG. 10, when the conditions R3-2 and R3-3 that are set as the AND conditions are met, the road type is determined to be unknown. As a result, determination accuracy regarding road type can be ensured. Possibility of the road type being erroneously determined to be the limited-access road and possibility of the road type being erroneously determined to be the ordinary road can be reduced. Therefore, permission/prohibition of LCS can be appropriately determined. LCS can be reliably prevented from being erroneously performed in a vehicle that is traveling on an ordinary road.

Here, when the road type determination process shown in FIG. 12 is performed, the LM recognizing unit 31, the object recognizing unit 33, and the RW likelihood calculating unit 42 of the ECU 20 are not requisite configurations.

Fifth Embodiment

According to a fifth embodiment, a case in which the scene determination is performed based on the landmark information that is recognized by the LM recognizing unit 31, the white line information that is recognized by the white line recognizing unit 32, and the object information regarding the periphery of the vehicle that is recognized by the object recognizing unit 33, the limited-access road likelihood Fm, the ordinary road likelihood Fg, and the RW likelihood Fr are calculated, and whether the road type is the limited-access road, the ordinary road, the ramp way, or unknown is determined will be described as an example.

Figure 13:
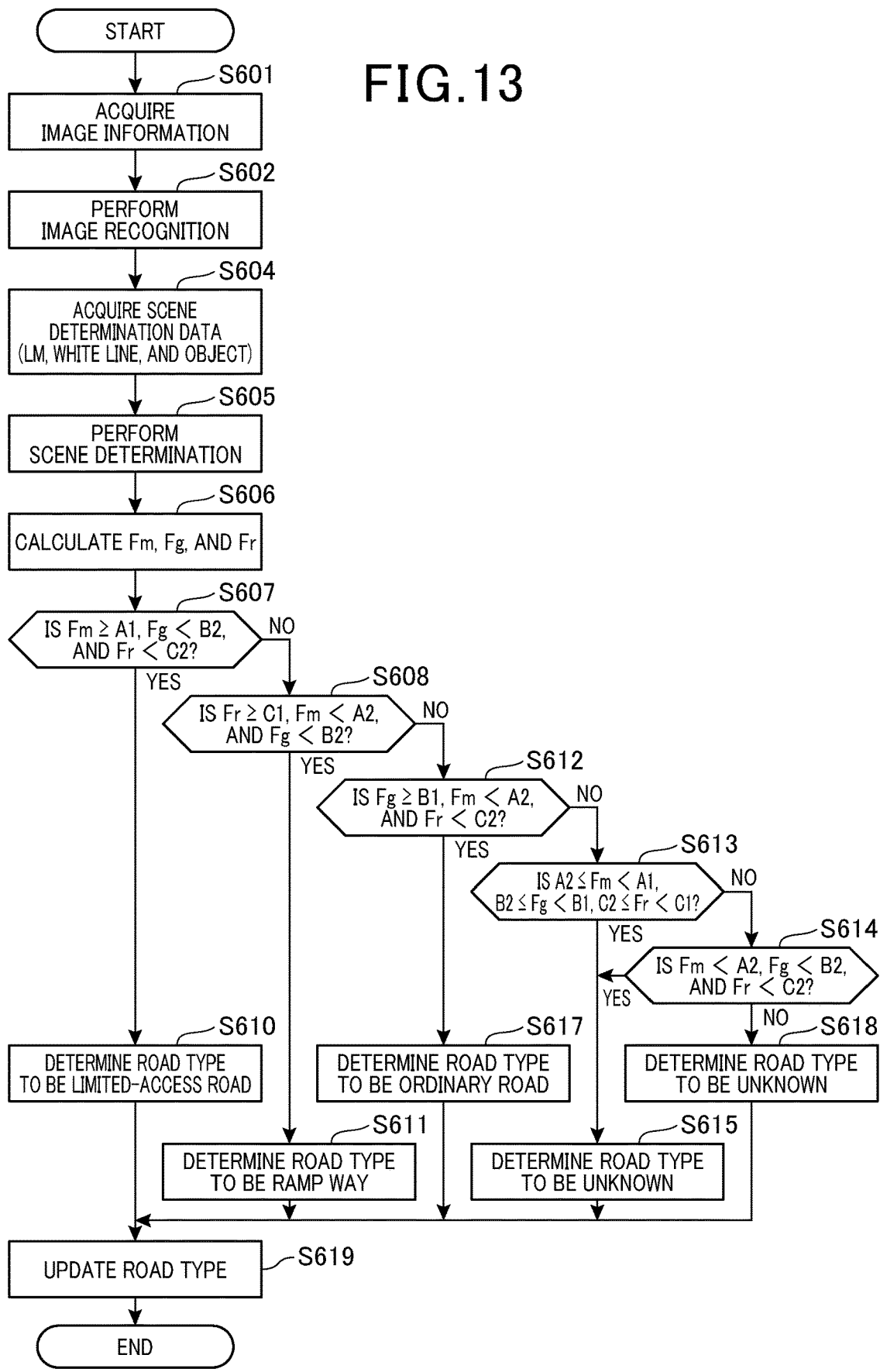
FIG. 13 is a flowchart of a road type determination process according a fifth embodiment.

FIG. 13 shows a flowchart of a road type determination process performed by the ECU 20. The process shown in FIG. 13 is repeatedly performed at a predetermined cycle during driving of the vehicle.

At step S601, the ECU 20 acquires, from the imaging apparatus 12, the image information that is acquired by an image of the periphery of the vehicle being captured. At subsequent step S602, the ECU 20 performs image recognition on the acquired image information, and the landmark information, the white line information, and recognizes the object information. Subsequently, at step S604, the scene determination data that corresponds to the landmark information, the white line information, and the object information is acquired.

At step S605, the ECU 20 performs the scene determination based on the scene determination data. For example, as described according to the first to fourth embodiments, the scene is determined to be a scene such as a road sign for a limited-access road is passed, a road sign for a limited-access road is passed and a white line for merging from a ramp way to a limited-access road is crossed, an intersection that has a traffic light, connection to a no-entry road, a no-passing zone, a sign that is characteristic of an ordinary road is recognized, an area between a sound-proofing wall and a median strip is being traveled, or a road on which a bicycle is traveling is being traveled.

The scene determination may be performed using the landmark information, the white line information, and the object information in a complementary manner. Alternatively, the scene determination may be performed such that the landmark information is given priority over the white line information or the object information.

At step S606, the ECU 20 calculates the limited-access road likelihood Fm, the ordinary road likelihood Fg, and the RW likelihood Fr based on the scene determination result. The magnitudes of the likelihoods Fm, Fg, and Fr that are calculated based on each scene are similar to those according to the first to fourth embodiments. Therefore, descriptions are omitted.

At step S607, the ECU 20 determines whether the limited-access road likelihood Fm, the ordinary road likelihood Fg, and the RW likelihood Fr respectively meet the limited-access road determination conditions (according to the present embodiment, Fm≥A1, Fg<B2, and Fr<C2). When all three conditions Fm≥A1, Fg<B2, and Fr<C2 are met, the ECU 20 proceeds to step S610 and determines the road type to be the limited-access road. Subsequently, the ECU 20 proceeds to step S619. When even a single condition that is not met is present among the three conditions Fm≥A1, Fg<B2, and Fr<C2, the ECU 20 proceeds to step S608.

At step S608, the ECU 20 determines whether the limited-access road likelihood Fm, the ordinary road likelihood Fg, and the RW likelihood Fr respectively meet the ramp way determination conditions (according to the present embodiment, Fm<A2, Fg<B2, and Fr≥C1). When all three conditions Fm<A2, Fg<B2, and Fr≥C1 are met, the ECU 20 proceeds to step S611 and determines the road type to be the ramp way. Subsequently, the ECU 20 proceeds to step S619. When even a single condition that is not met is present among the three conditions Fm<A2, Fg<B2, and Fr≥C1, the ECU 20 proceeds to step S612.

At step S612, the ECU 20 determines whether the limited-access road likelihood Fm, the ordinary road likelihood Fg, and the RW likelihood Fr respectively meet the ordinary road determination conditions (according to the present embodiment, Fm<A2, Fg≥B1, and Fr<C2). When all three conditions Fm<A2, Fg≥B1, and Fr<C2 are met, the ECU 20 proceeds to step S617 and determines the road type to be the ordinary road. Subsequently, the ECU 20 proceeds to step S619. When even a single condition that is not met is present among the three conditions Fm<A2, Fg≥B1, and Fr<C2, the ECU 20 proceeds to step S613.

At step S613, the ECU 20 determines whether the limited-access road likelihood Fm, the ordinary road likelihood Fg, and the RW likelihood Fr respectively meet the first unknown conditions (according to the present embodiment, A2≤Fm<A1, B2≤Fg<B1, and C2≤Fr<C1). When all three conditions A2≤Fm<A1, B2≤Fg<B1, and C2≤Fr<C1 are met, the ECU 20 proceeds to step S615 and determines the road type to be unknown. Subsequently, the ECU 20 proceeds to step S619. When even a single condition that is not met is present among the three conditions A2≤Fm<A1, B2≤Fg<B1, and C2≤Fr<C1, the ECU 20 proceeds to step S614.

At step S614, the ECU 20 determines whether the limited-access road likelihood Fm, the ordinary road likelihood Fg, and the RW likelihood Fr respectively meet the second unknown conditions (according to the present embodiment, Fm<A2, Fg<B2, and Fr<C2). When all three conditions Fm<A2, Fg<B2, and Fr<C2 are met, the ECU 20 proceeds to step S615 and determines the road type to be unknown. Subsequently, the ECU 20 proceeds to step S619. When even a single condition that is not met is present among the three conditions Fm<A2, Fg<B2, and Fr<C2, the ECU 20 proceeds to step S618 and determines the road type to be unknown.

A case in which the road type is determined to be unknown at step S618 corresponds to a case in which the determination result is particularly more ambiguous than that when the road type is determined to be unknown at step S615. Therefore, when the road type is determined to be unknown at step S618, as shown in FIG. 13, the ECU 20 may subsequently proceed to step S619 or may not update the road type in a manner similar to that at step S113 in FIG. 2 according to the first embodiment.

At step S619, the ECU 20 updates the road type based on the road type determined at step S610, S615, S617, or S618, and is ends the process.

As described above, in the road type determination process according to the fifth embodiment, the ECU 20 determines the road type by performing the scene determination based on the landmark information that is recognized by the LM recognizing unit 31, the white line information that is recognized by the white line recognizing unit 32, and the object information regarding the periphery of the vehicle that is recognized by the object recognizing unit 33, and updates the stored road type.

The road type is determined using the limited-access road likelihood Fm, the ordinary road likelihood Fg, and the RW likelihood Fr. As indicated by a solid line in FIG. 14, when the road type changes among the ordinary road, the ramp way, and the limited-access road, the road type changes from the ramp way to the limited-access road when a condition R4-2 (Fm≥A1 and Fr<C2) is met.

In addition, the road type changes from the ramp way to the ordinary road when a condition R4-4 (Fg≥B1 and Fr<C2) is met. Furthermore, the road type changes from the ordinary road or the limited-access road to the ramp way when a condition R4-1 (Fr≥C1 and Fg<B2) or a condition R4-3 (Fr≥C1 and Fm<A2) is met.

Figure 14:
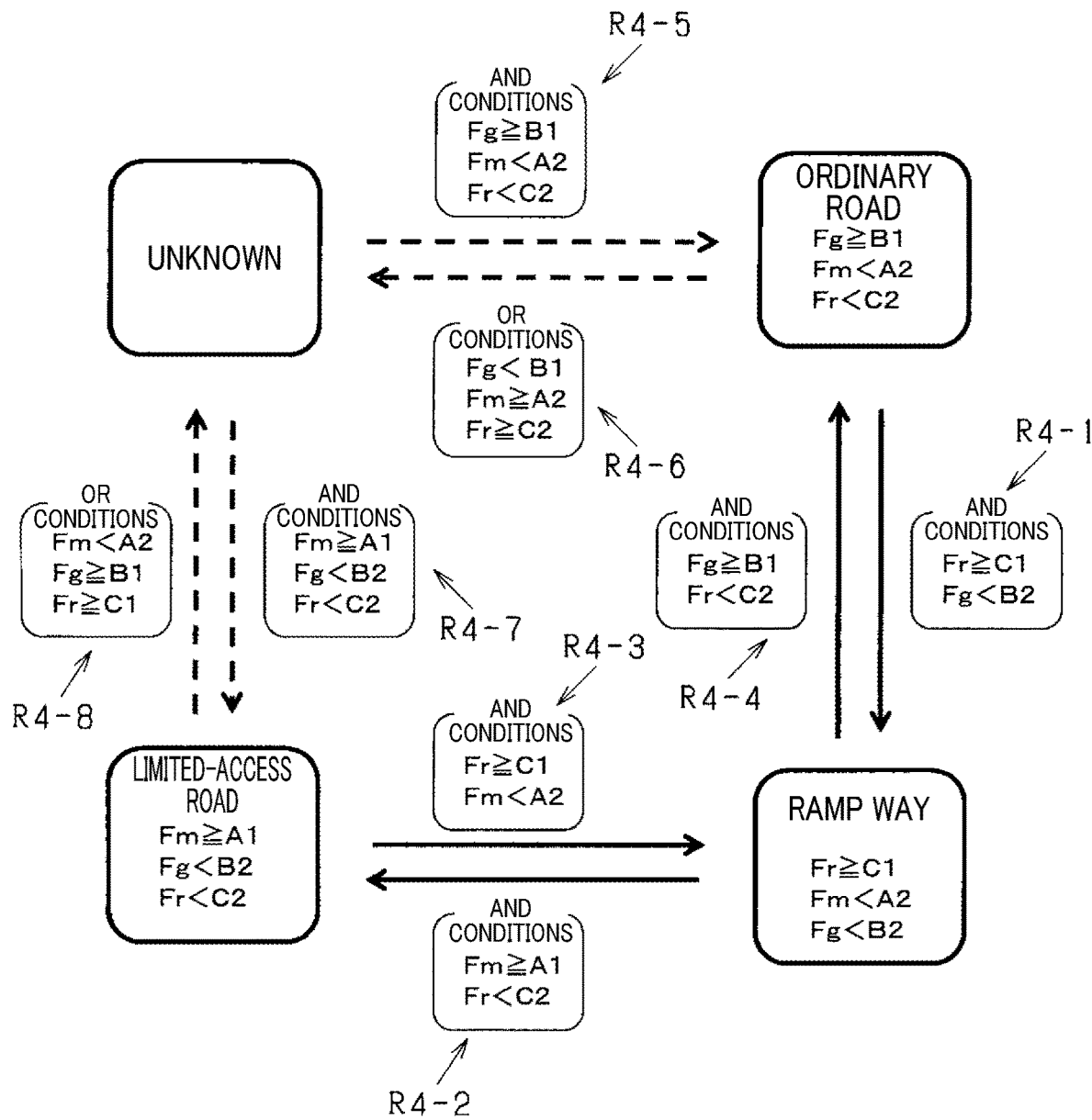
FIG. 14 is a conceptual diagram of the road type determination process according to the fifth embodiment.

In addition, as indicated by a broken line in FIG. 14, the road type is determined to be unknown when a condition R4-6 (Fm≥A2, Fg<B1, or Fr≥C2) or a condition R4-8 (Fm<A2, Fg≥B1, or Fr≥C1) that are set as OR conditions is met. Furthermore, the road type changes from unknown to the ordinary road when a condition R4-5 (Fg≥B1, Fm<A2, and Fr<C2) that is set as AND conditions is met. Moreover, the road type changes from unknown to the limited-access road when a condition R4-7 (Fm≥A1, Fg<B2, and Fr<C2) that is set as AND conditions is met.

As a result, the travel road of the vehicle being the limited-access road, the rampway, or the ordinary road can be determined with more accuracy. In addition to the possibility of the road type being erroneously determined to be the limited-access road and the possibility of the road type being erroneously determined to be the ordinary road, the possibility of the road type being erroneously determined to be the rampway can be reduced. Therefore, driving assistance based on each road type can be appropriately performed. In addition, permission/prohibition of LCS can be appropriately determined. LCS can be reliably prevented from being erroneously performed in a vehicle that is traveling on an ordinary road.

According to the above-described embodiments, following effects can be obtained.

The ECU 20 includes the road type determining unit 21 that includes the image information acquiring unit 23, the image recognizing unit 30, the scene determining unit 35, the likelihood calculating unit 40, and the type determining unit 45.

The image information acquiring unit 23 acquires the image information in which an image of the travel road on which the vehicle is traveling is captured. The image recognizing unit 30 determines the traveling scene of the travel road of the vehicle based on the image recognition result of the image information. The ordinary road likelihood calculating unit 41 calculates the ordinary road likelihood Fg that indicates that the type of the travel road of the vehicle is the ordinary road based on the traveling scene. The limited-access road likelihood calculating unit 43 calculates the limited-access road likelihood Fm that indicates that the type of the travel road of the vehicle is the limited-access road based on the traveling scene.

The type determining unit 45 determines the type of the travel road of the vehicle based on the ordinary road likelihood Fg and the limited-access road likelihood Fm. Because the road type can be determined based on the ordinary road likelihood Fg and the limited-access road likelihood Fm that are calculated based on the traveling scene, the type of the road on which the vehicle is traveling can be more reliably determined.

The ECU 20 further includes the RW likelihood calculating unit 42 that calculates the RW likelihood Fr that indicates the travel road of the vehicle is the ramp way based on the traveling scene. As a result, the road type can be determined to be the ramp way, in addition to the ordinary road and the limited-access road.

The type determining unit 45 may be configured to determine the type of the travel road of the vehicle to be either of the ordinary road and the limited-access road based on the ordinary road likelihood Fg and the limited-access road likelihood Fm.

The type determining unit 45 may be configured to determine the type of the travel road of the vehicle to be any of the ordinary road, the limited-access road, and unknown based on the ordinary road likelihood Fg and the limited-access road likelihood Fm.

The type determining unit 45 may be configured to determine the type of the travel road of the vehicle to be any of the ordinary road, the limited-access road, and the ramp way based on the ordinary road likelihood Fg, the limited-access road likelihood Fm, and the ramp way likelihood Fr.

The type determining unit 45 may be configured to determine the type of the travel road of the vehicle to be any of the ordinary road, the limited-access road, the ramp way, and unknown based on the ordinary road likelihood Fg, the limited-access road likelihood Fm, and the ramp way likelihood Fr.

The type determining unit 45 may be configured to determine the road type based on a comparison to predetermined thresholds that are respectively set for the ordinary road likelihood Fg, the limited-access road likelihood Fm, and the ramp way likelihood Fr. For example, the type determining unit 4 may determine that the road type that has a large likelihood is the road type of the travel road of the vehicle. Specifically, for example, the travel road may be determined to be a limited-access road when the limited-access road likelihood Fm is equal to or greater than the predetermined first threshold A1.

In addition, for example, the type determining unit 45 may determine that the road type that has a large likelihood is the road type of the travel road of the vehicle when the likelihood of a certain road type is large and the likelihood of another road type is small. Specifically, for example, the travel road of the vehicle may be determined to be a limited-access road when the limited-access road likelihood Fm is equal to or greater than the predetermined threshold A1, and the ordinary road likelihood Fg is less than the predetermined fourth threshold B2.

Furthermore, for example, the travel road of the vehicle may be determined to be a limited-access road when the limited-access road likelihood Fm is equal to or greater than the predetermined threshold A1, the ordinary road likelihood Fg is less than the predetermined fourth threshold B2, and the RW likelihood Fr is less than the predetermined sixth threshold C2.

The image recognizing unit 30 is preferably configured to include at least any one of the landmark recognizing unit 31, the white line recognizing unit 32, and the object recognizing unit 33. In addition, the scene determining unit 35 is preferably configured to determine the traveling scene based on at least any one of the landmark information, the white line information, and the object information. That is, the scene determination by the scene determining unit 35 is preferably performed by the landmark information, the white line information, and the object information on objects that are not applicable as landmarks being given an order of priority or used in a complementary manner.

Furthermore, the ECU 20 includes the driving assisting unit 22 that performs driving assistance of the vehicle based on the type of the travel road of the vehicle determined by the road type determining unit 21. The driving assisting unit 22 is preferably configured to include the LCS unit 53 that performs driving assistance in which the vehicle is made to automatically change traffic lanes, and permit the performance of lane change by the LCS unit 53 when the travel road of the vehicle is determined to be the limited-access road.

Furthermore, the driving assisting unit 22 may be configured to prohibit the performance of lane change by the LCS unit 53 when the travel road of the vehicle is not determined to be the limited-access road. Whether the performance of lane change by the LCS unit 53 is permitted or prohibited can be determined based on the road type that is more reliably determined by the road type determining unit 21. As a result, for example, LCS can be reliably prevented from being erroneously performed in a vehicle that is traveling on an ordinary road.

Here, a sensor other than the imaging apparatus 12 may be mounted in the vehicle. For example, sensors such as a radar sensor, a vehicle speed sensor, a yaw rate sensor, a steering angle sensor, an acceleration sensor, and a gyro sensor may be mounted. In addition, the ECU 20 may be configured to be capable of acquiring detection information from the sensors other than the above-described imaging apparatus 12, and using the detection information in the determination process by the road type determining unit 21 and driving assistance by the driving assisting unit 22.

Furthermore, the driving assisting unit 22 may be configured to change the driving assistance processes by the ACC unit 51, the LKA unit 52, and the PCS unit 54 based on the road type that is determined by the road type determining unit 21. Moreover, the driving assisting unit 22 may be provide functions related to driving assistance that are not shown in FIG. 1, and may be configured to change the processes related to driving assistance based on the road type that is determined by the road type determining unit 21.

In addition, the relationships among the likelihoods Fm, Fg, and Fr, the traveling scenes, and the landmark information, the white line information, and the object information described as examples in the present specification are merely examples and can be adjusted as appropriate based on laws and regulations, and environments of each country. For example, a road sign that indicates an exit of a limited-access road, or a road sign that indicates an entrance or an exit of a highway may be set as a landmark.

In addition, in the flowcharts according to the embodiments, in the determination process in which the plurality of conditions are set regarding the magnitudes of the likelihoods Fm, Fg, and Fr, all or a portion of the plurality of conditions may be individually determined. For example, regarding the three conditions that are Fm<A2, Fg<B2, and Fr≥C1 indicated at step S311 in FIG. 6, the flowchart may be configured such that determinations are individually performed for the condition that is Fm<A2, the condition that is Fg<B2, and the condition that is Fr≥C1. Alternatively, the determinations may be separated into the determination regarding the condition that is Fr≥C1 and the determination regarding the condition that is Fm<A2 and Fg<B2.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A road type determination apparatus comprising:
    an image information acquiring unit that acquires image information in which an image of a travel road on which a vehicle is traveling is captured;
    a scene determining unit that determines a traveling scene of the travel road based on the image information;
    an ordinary road likelihood calculating unit that calculates an ordinary road likelihood that indicates that a type of the travel road of the vehicle is an ordinary road based on the traveling scene;
    a limited-access road likelihood calculating unit that calculates a limited-access road likelihood that indicates that the type of the travel road of the vehicle is a limited-access road based on the traveling scene; and
    a type determining unit that determines the type of the travel road of the vehicle to be either the ordinary road or the limited-access road, based on the ordinary road likelihood and the limited-access road likelihood, and determines the type of the travel road of the vehicle to be the limited-access road, in response to the limited-access road likelihood being equal to or greater than a predetermined first threshold and the ordinary road likelihood being less than a predetermined fourth threshold,
    wherein
    driving assistance of the vehicle is performed by a driving assisting unit based on the type of travel road of the vehicle determined by the type determining unit.

2. The road type determination apparatus according to claim 1, wherein:
    the type determining unit determines the type of the travel road of the vehicle to be any of the ordinary road, the limited-access road, and unknown based on the ordinary road likelihood and the limited-access road likelihood.

3. The road type determination apparatus according to claim 1, further comprising:
    a ramp way likelihood calculating unit that calculates a ramp way likelihood that indicates that the travel road of the vehicle is a ramp way based on the traveling scene.

4. The road type determination apparatus according to claim 3, wherein:
    the type determining unit determines the type of the travel road of the vehicle to be any of the ordinary road, the limited-access road, and the ramp way based on the ordinary road likelihood, the limited-access road likelihood, and the ramp way likelihood.

5. The road type determination apparatus according to claim 3, wherein:
    the type determining unit determines the type of the travel road of the vehicle to be any of the ordinary road, the limited-access road, the ramp way, and unknown based on the ordinary road likelihood, the limited-access road likelihood, and the ramp way likelihood.

6. The road type determination apparatus according to claim 1, wherein:
    the type determining unit determines the travel road of the vehicle to be the limited-access road when the limited-access road likelihood is equal to or greater than a predetermined first threshold.

7. The road type determination apparatus according to claim 6, wherein:
    the type determining unit determines the travel road of the vehicle to be the limited-access road when a time during which the limited-access road likelihood is equal to or greater than the predetermined first threshold is equal to or greater than a predetermined time.

8. The road type determination apparatus according to claim 1, further comprising:
    a landmark recognizing unit that recognizes, from the image information, landmarks that are set as differing types of boundary markers of a road or geographical features that serve as markers, wherein
    the scene determining unit determines the traveling scene based on landmark information that is related to the landmark recognized by the landmark recognizing unit.

9. The road type determination apparatus according to claim 1, further comprising:
    a white line recognizing unit that recognizes a white line on the travel road of the vehicle from the image information, wherein
    the scene determining unit determines the traveling scene based on white line information that is related to the white line recognized by the white line recognizing unit.

10. The road type determination apparatus according to claim 1, further comprising:
    an object recognizing unit that recognizes an object in a periphery of the vehicle from the image information, wherein
    the scene determining unit determines the traveling scene based on object information that is related to the object recognized by the object recognizing unit.

11. A driving assistance apparatus that performs driving assistance of a vehicle based on a type of a travel road of the vehicle determined by a road type determination apparatus, the road type determination apparatus comprising:
    an image information acquiring unit that acquires image information in which an image of a travel road on which a vehicle is traveling is captured;
    a scene determining unit that determines a traveling scene of the travel road based on the image information;
    an ordinary road likelihood calculating unit that calculates an ordinary road likelihood that indicates that a type of the travel road of the vehicle is an ordinary road based on the traveling scene;
    a limited-access road likelihood calculating unit that calculates a limited-access road likelihood that indicates that the type of the travel road of the vehicle is a limited-access road based on the traveling scene; and
    a type determining unit that determines the type of the travel road of the vehicle based on the ordinary road likelihood and the limited-access road likelihood, wherein the type determining unit determines the type of the travel road of the vehicle to be either of the ordinary road or the limited-access road, based on the ordinary road likelihood and the limited-access road likelihood, and determines the type of the travel road of the vehicle to be the limited-access road, in response to the limited-access road likelihood being equal to or greater than a predetermined first threshold and the ordinary road likelihood being less than a predetermined fourth threshold, the driving assistance apparatus being configured to:
  permit performance of driving assistance to make the vehicle automatically change traffic lanes in response to the travel road of the vehicle being determined to be a limited-access road; and
  prohibit performance of driving assistance to make the vehicle automatically change traffic lanes in response to the travel road of the vehicle not being determined to be the limited-access road, wherein
driving assistance of the vehicle is performed by a driving assisting unit based on the type of travel road of the vehicle determined by the type determining unit.

12. A road type determination apparatus comprising:
an image information acquiring unit that acquires image information in which an image of a travel road on which a vehicle is traveling is captured;
a scene determining unit that determines a traveling scene of the travel road based on the image information;
an ordinary road likelihood calculating unit that calculates an ordinary road likelihood that indicates that a type of the travel road of the vehicle is an ordinary road based on the traveling scene;
a limited-access road likelihood calculating unit that calculates a limited-access road likelihood that indicates that the type of the travel road of the vehicle is a limited-access road based on the traveling scene; and
a type determining unit that determines the type of the travel road of the vehicle based on the ordinary road likelihood and the limited-access road likelihood, wherein:
the type determining unit determines the type of the travel road of the vehicle to be any of the ordinary road, the limited-access road, and unknown based on the ordinary road likelihood and the limited-access road likelihood, and determines the type of the travel road of the vehicle to be unknown, in response to the ordinary road likelihood not meeting a predetermined first condition and the limited-access road likelihood not meeting a predetermined second condition, wherein
driving assistance of the vehicle is performed by a driving assisting unit based on the type of travel road of the vehicle determined by the type determining unit.

13. A road type determination apparatus comprising:
an image information acquiring unit that acquires image information in which an image of a travel road on which a vehicle is traveling is captured;
a scene determining unit that determines a traveling scene of the travel road based on the image information;
an ordinary road likelihood calculating unit that calculates an ordinary road likelihood that indicates that a type of the travel road of the vehicle is an ordinary road based on the traveling scene;
a limited-access road likelihood calculating unit that calculates a limited-access road likelihood that indicates that the type of the travel road of the vehicle is a limited-access road based on the traveling scene;
a ramp way likelihood calculating unit that calculates a ramp way likelihood that indicates that the travel road of the vehicle is a ramp way based on the traveling scene; and
a type determining unit that determines the type of the travel road of the vehicle based on the ordinary road likelihood and the limited-access road likelihood, wherein:
the type determining unit determines the type of the travel road of the vehicle to be any of the ordinary road, the limited-access road, the ramp way, and unknown based on the ordinary road likelihood, the limited-access road likelihood, and the ramp way likelihood, and determines the type of the travel road of the vehicle to be unknown, in response to in response to the ordinary road likelihood not meeting a predetermined first condition and the limited-access road likelihood not meeting a predetermined second condition and the ramp way likelihood not meeting a predetermined third condition, wherein
driving assistance of the vehicle is performed by a driving assisting unit based on the type of travel road of the vehicle determined by the type determining unit.

* * * * *